US010165899B2

(12) United States Patent
Bournay, Jr. et al.

(10) Patent No.: US 10,165,899 B2
(45) Date of Patent: Jan. 1, 2019

(54) IMMERSION BLENDER

(71) Applicant: WHIRLPOOL CORPORATION, Benton Harbor, MI (US)

(72) Inventors: Fred Bournay, Jr., Dowagiac, MI (US); John W. McConnell, St. Joseph, MI (US); Joel Graham Van Faasen, Holland, MI (US); ZhaoYi Yin, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 322 days.

(21) Appl. No.: 15/017,183

(22) Filed: Feb. 5, 2016

(65) Prior Publication Data

US 2016/0235250 A1 Aug. 18, 2016

Related U.S. Application Data

(60) Provisional application No. 62/117,748, filed on Feb. 18, 2015, provisional application No. 62/162,118, filed on May 15, 2015.

(51) Int. Cl.
*A47J 43/044* (2006.01)
(52) U.S. Cl.
CPC .... *A47J 43/044* (2013.01); *A47J 2043/04409* (2013.01); *A47J 2043/04427* (2013.01); *A47J 2043/04436* (2013.01)
(58) Field of Classification Search
CPC ...................................... A47J 43/044
USPC ................................. 366/129, 282
See application file for complete search history.

(56) References Cited

U.S. PATENT DOCUMENTS

| 2,789,799 A | 4/1957 | Kaufman |
| 2,804,290 A | 8/1957 | Kaufman |
| 3,523,629 A * | 8/1970 | Yiu ...................... A47J 43/042 222/241 |

(Continued)

FOREIGN PATENT DOCUMENTS

| CN | 101242764 B | 10/2010 |
| EP | 2130469 A1 | 12/2009 |

(Continued)

OTHER PUBLICATIONS

European Patent Office, "European Search Report," dated Jul. 1, 2016 (5 Pages).

*Primary Examiner* — Abbas Rashid
(74) *Attorney, Agent, or Firm* — Price Heneveld LLP

(57) ABSTRACT

A mixing appliance assembly includes a housing, which includes a motor and shaft operably coupled with the motor and extending outwardly from the housing. A top handle is operably coupled with a top end of the housing and includes a pulse button and a continuous run switch. A side port is disposed in the housing and configured to receive a port connecting member and includes an interlocking feature. An interlock switch is disposed inside the side port. A switch engagement member is configured to engage the interlock switch such that the continuous run switch can be depressed. A bowl clamp is engageable with the side port and configured to removably secure the housing to a bowl and includes the switch engagement member. A side handle is engageable with the side port and is configured to be removably coupled with the housing and aid a user in handling the mixing appliance.

10 Claims, 34 Drawing Sheets

(56) References Cited

U.S. PATENT DOCUMENTS

| | | | |
|---|---|---|---|
| 3,810,605 A * | 5/1974 | Lambert | A47J 36/165 366/282 |
| 3,924,169 A | 12/1975 | Craft et al. | |
| D327,603 S | 7/1992 | van Asten | |
| 5,316,382 A | 5/1994 | Penaranda et al. | |
| D348,587 S | 7/1994 | Saltet | |
| 5,368,384 A * | 11/1994 | Duncan | A47J 43/044 219/227 |
| 5,372,422 A * | 12/1994 | Dubroy | A47J 36/165 366/143 |
| D358,293 S | 5/1995 | Sebastia | |
| D361,241 S | 8/1995 | Littmann | |
| 5,567,047 A | 10/1996 | Fritsch | |
| D383,938 S | 9/1997 | Littmann | |
| D398,809 S | 9/1998 | Henderson | |
| D400,756 S | 11/1998 | Henderson | |
| 5,836,684 A | 11/1998 | Safont et al. | |
| D421,872 S | 3/2000 | Wong | |
| D425,368 S | 5/2000 | Littmann | |
| D426,105 S | 6/2000 | Littmann | |
| 6,113,258 A * | 9/2000 | Ardent | A47J 36/165 366/282 |
| 6,186,656 B1 | 2/2001 | Peñaranda et al. | |
| 6,193,404 B1 | 2/2001 | Calange | |
| D447,380 S | 9/2001 | Feil | |
| 6,286,990 B1 * | 9/2001 | De Zuazo Torres | A47J 36/165 366/282 |
| 6,293,691 B1 | 9/2001 | Rebordosa et al. | |
| 6,488,400 B1 | 12/2002 | Masip et al. | |
| D485,729 S | 1/2004 | Patton et al. | |
| D494,410 S | 8/2004 | Stuart et al. | |
| D506,102 S | 6/2005 | Ikegaki | |
| D510,837 S | 10/2005 | Lloyd et al. | |
| 6,974,244 B1 | 12/2005 | Lin | |
| D534,032 S | 12/2006 | Lloyd | |
| 7,172,334 B2 | 2/2007 | Chiappetta | |
| 7,267,476 B2 | 9/2007 | Rutigliano et al. | |
| D592,447 S | 5/2009 | Blaise | |
| 7,530,510 B2 * | 5/2009 | Newman | A47J 43/044 241/37.5 |
| D614,438 S | 4/2010 | Fukasawa | |
| 7,706,671 B2 * | 4/2010 | Brown | A47J 27/62 219/238 |
| 7,766,540 B2 * | 8/2010 | Saunders | A47J 43/044 366/251 |
| D623,009 S | 9/2010 | Bodum | |
| 7,874,719 B2 | 1/2011 | Markle et al. | |
| D638,565 S | 5/2011 | Brinckerhoff et al. | |
| D644,479 S | 9/2011 | Lownds et al. | |
| 8,033,712 B2 | 10/2011 | Calange | |
| D649,394 S | 11/2011 | Grabes et al. | |
| D663,573 S | 7/2012 | Nordwall | |
| D668,911 S | 10/2012 | Bachmann et al. | |
| 8,353,620 B2 | 1/2013 | Ogrizek et al. | |
| D681,391 S | 5/2013 | Agren | |
| D695,565 S | 12/2013 | Verbrugge et al. | |
| D703,481 S | 4/2014 | Lownds | |
| D724,374 S | 3/2015 | Sanguinetti | |
| D731,236 S | 6/2015 | Yin | |
| 9,049,966 B2 * | 6/2015 | Audette | A47J 43/0777 |
| 9,545,175 B2 * | 1/2017 | Audette | A47J 43/0722 |
| 9,642,494 B1 * | 5/2017 | Brun | A47J 43/044 |
| 9,848,738 B2 * | 12/2017 | Audette | A47J 43/0766 |
| 2003/0193835 A1 * | 10/2003 | Richardson | A47J 36/165 366/282 |
| 2005/0111296 A1 | 5/2005 | Rutigliano et al. | |
| 2005/0276158 A1 | 12/2005 | Thomas | |
| 2005/0281130 A1 | 12/2005 | Hsieh | |
| 2009/0303830 A1 * | 12/2009 | Wilson | A47J 43/044 366/129 |
| 2012/0097775 A1 | 4/2012 | Wade et al. | |

FOREIGN PATENT DOCUMENTS

| | | |
|---|---|---|
| WO | 2011001312 A1 | 1/2011 |
| WO | 2011113082 A1 | 9/2011 |

* cited by examiner

IMMERSION BLENDER

CROSS-REFERENCE TO RELATED APPLICATIONS

This application claims priority to and the benefit under 35 U.S.C. § 119(e) of U.S. Provisional Application No. 62/117,748, filed Feb. 18, 2015, entitled "IMMERSION BLENDER," and U.S. Provisional Application No. 62/162,118, filed May 15, 2015, entitled "HAND BLENDER," the entire disclosures of which are hereby incorporated herein by reference.

BACKGROUND OF THE DISCLOSURE

The present disclosure generally relates to a blender, and more specifically, to an immersion or hand blender for use in mixing food goods.

FIELD OF THE DISCLOSURE

Current hand blenders can be difficult to control, which leads to fatigue and performance issues. In addition, a user grabs the blending arm, which leads to potential safety and sanitary concerns with the food being prepared. Also, current hand blenders have permanently mounted handles or stand-alone mixing pot mounting solutions that are cumbersome and expensive. These systems generally require a user to reset an on/off switch after releasing a pulse button and a continuous run feature is offered directly through the switch. In the present disclosure, a port can be used for multiple features and devices, such as a pot mounting device or a secondary handle. The present disclosure also includes a unique operating state without having to reset through an on/off switch.

SUMMARY OF THE DISCLOSURE

One aspect of the present disclosure includes a mixing appliance assembly. A housing includes a motor and a shaft operably coupled with the motor and extending outwardly from the housing. A top handle is operably coupled with a top end of the housing and includes a pulse button and a continuous run switch. A side port is disposed in the housing. The side port is configured to receive a port connecting member and includes an interlocking feature. An interlock switch is disposed inside the side port. A switch engagement member is configured to engage the interlock switch such that the continuous run switch can be depressed. A bowl clamp is engageable with the side port and is configured to removably secure the housing to a bowl. The bowl clamp includes the switch engagement member. A side handle is engageable with the side port and is configured to be removably coupled with the housing and aid a user in handling the mixing appliance. The side handle is free of the switch engagement member.

Another aspect of the present disclosure includes a mixing appliance assembly. A housing includes a top end and a bottom end. A shaft extends from the bottom end of the housing. The shaft includes a proximal end and a distal end. A motor is disposed inside the housing and is operably coupled with the proximal end of the shaft. A blade is disposed on the distal end of the shaft and is configured to rotate about a central axis of the shaft upon activation of the motor. A top handle is operably coupled with the top end of the housing. A side port is disposed in the housing. The side port is configured to engage at least one of a handle and a bowl clamp. The side port includes an interlocking feature that is actuated when the bowl clamp is engaged with the side port such that a continuous run feature of the motor can be activated.

Yet another aspect of the present disclosure includes a mixing appliance assembly. A housing includes a motor and a shaft operably coupled with the motor and extending outwardly from the housing. A top handle is operably coupled with a top end of the housing and includes a pulse button. A port is disposed in the housing. The port includes an interlocking feature that is actuated upon connection with a bowl clamp such that a continuous run feature of the motor can be activated.

These and other features, advantages, and objects of the present disclosure will be further understood and appreciated by those skilled in the art by reference to the following specification, claims, and appended drawings.

DETAILED DESCRIPTION

Figure 1:
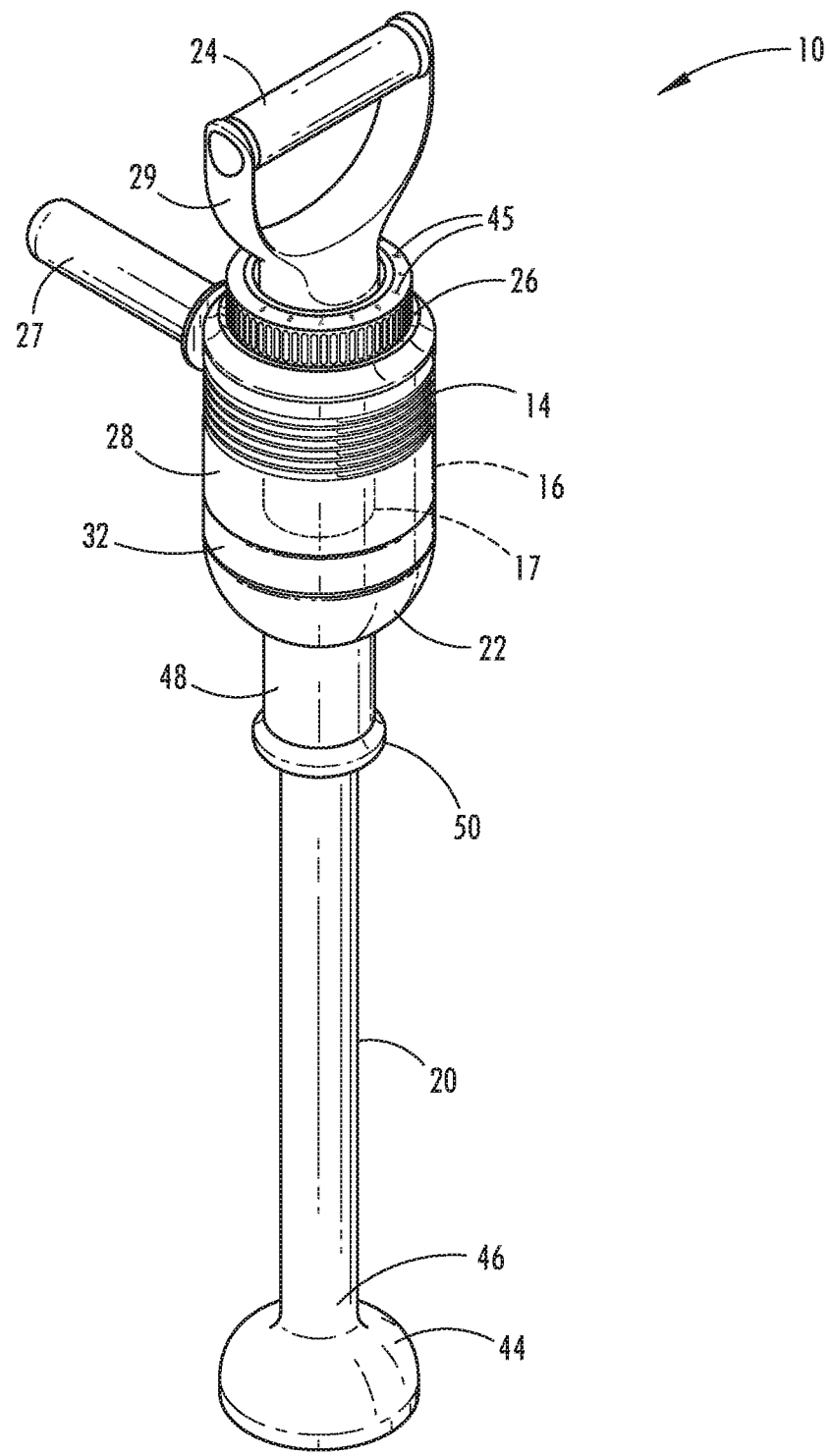
FIG. 1 is a top perspective view of an immersion blender of the present disclosure.
Figure 2:
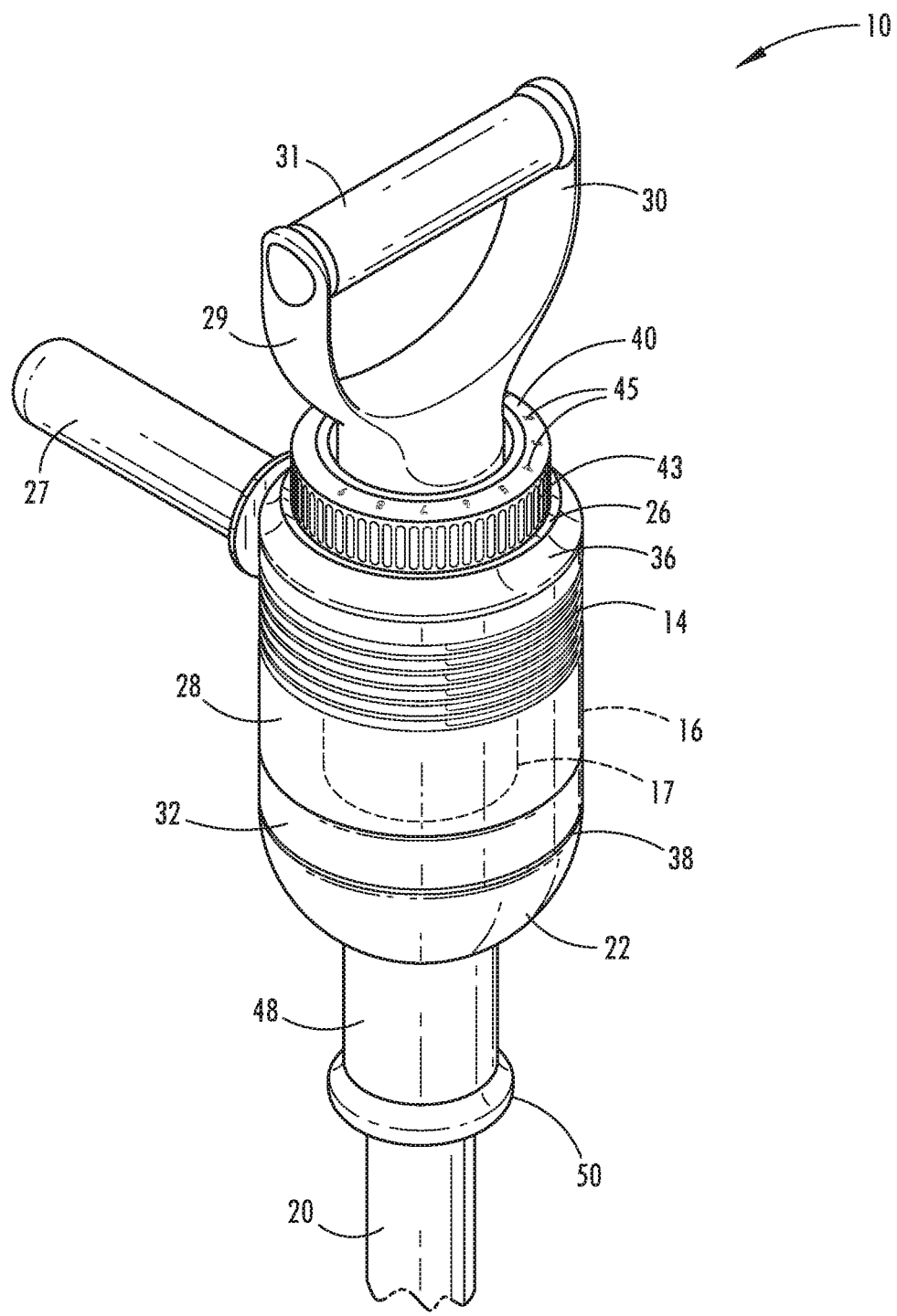
FIG. 2 is an enlarged partial top perspective view of an upper portion of the immersion blender of FIG. 1.
Figure 3:
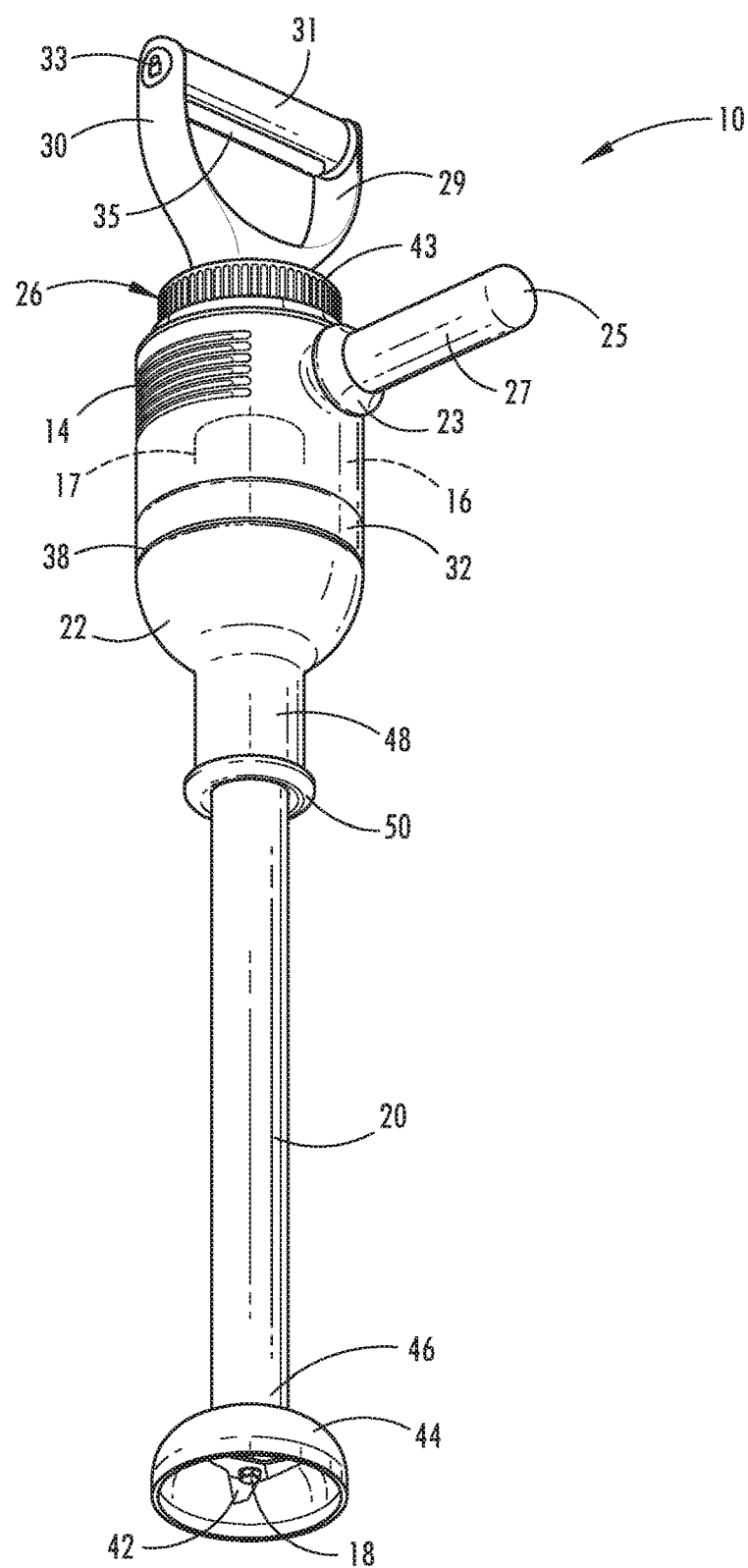
FIG. 3 is a bottom perspective view of the immersion blender of FIG. 1.
Figure 4:
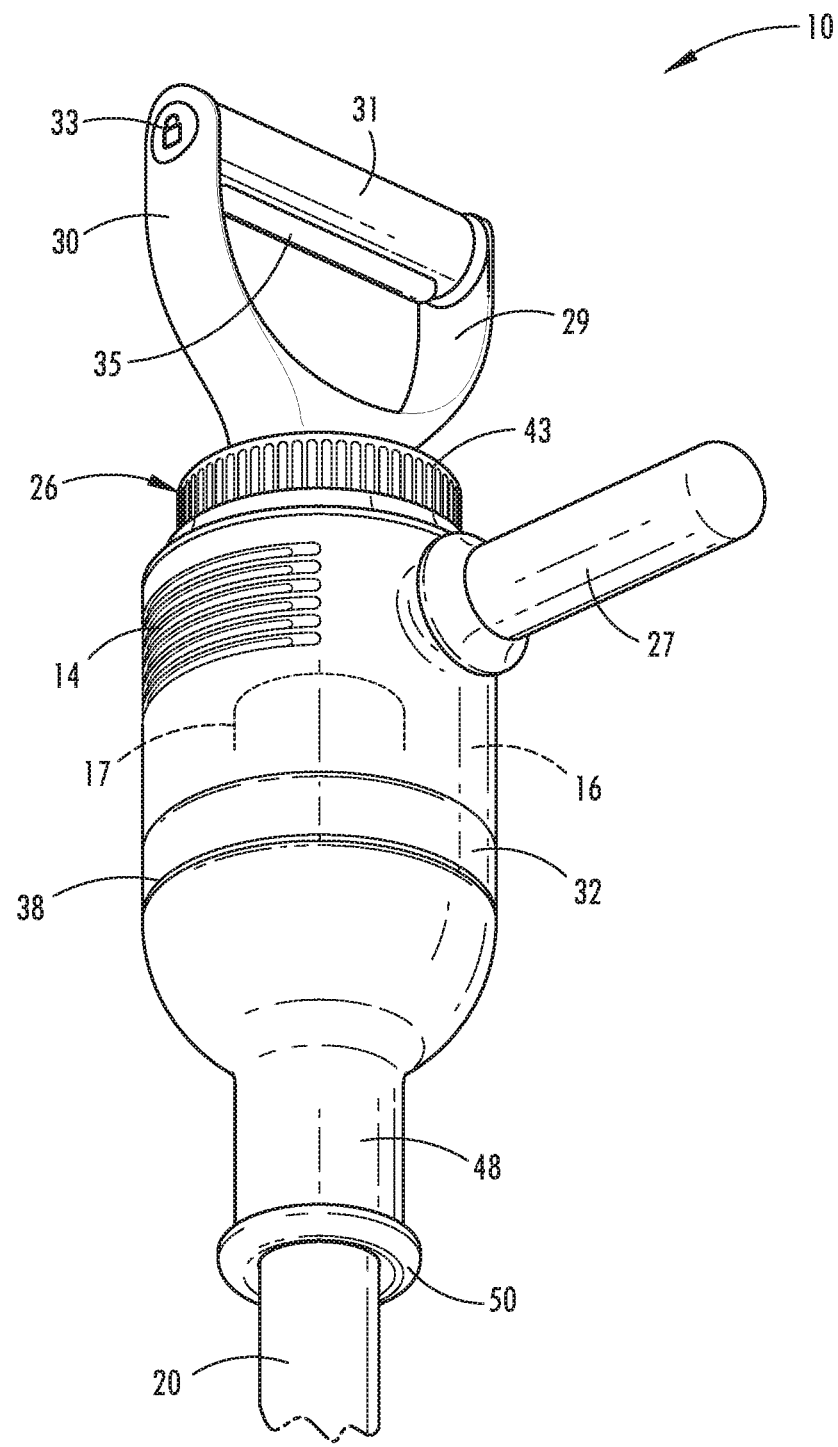
FIG. 4 is an enlarged partial bottom perspective view of the upper portion of the immersion blender of FIG. 1.
Figure 5:
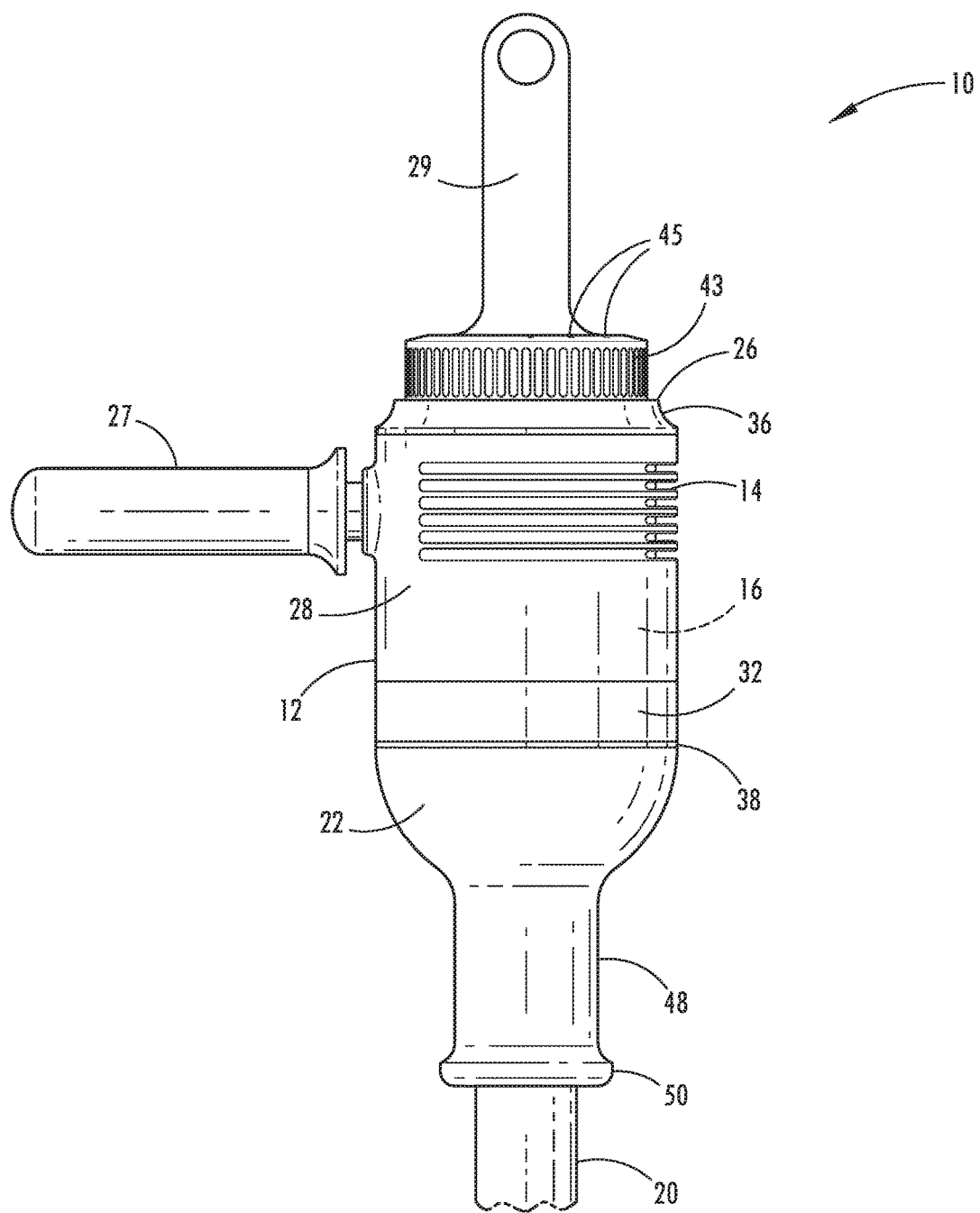
FIG. 5 is an enlarged partial first side elevational view of the upper portion of the immersion blender of FIG. 1.
Figure 6:
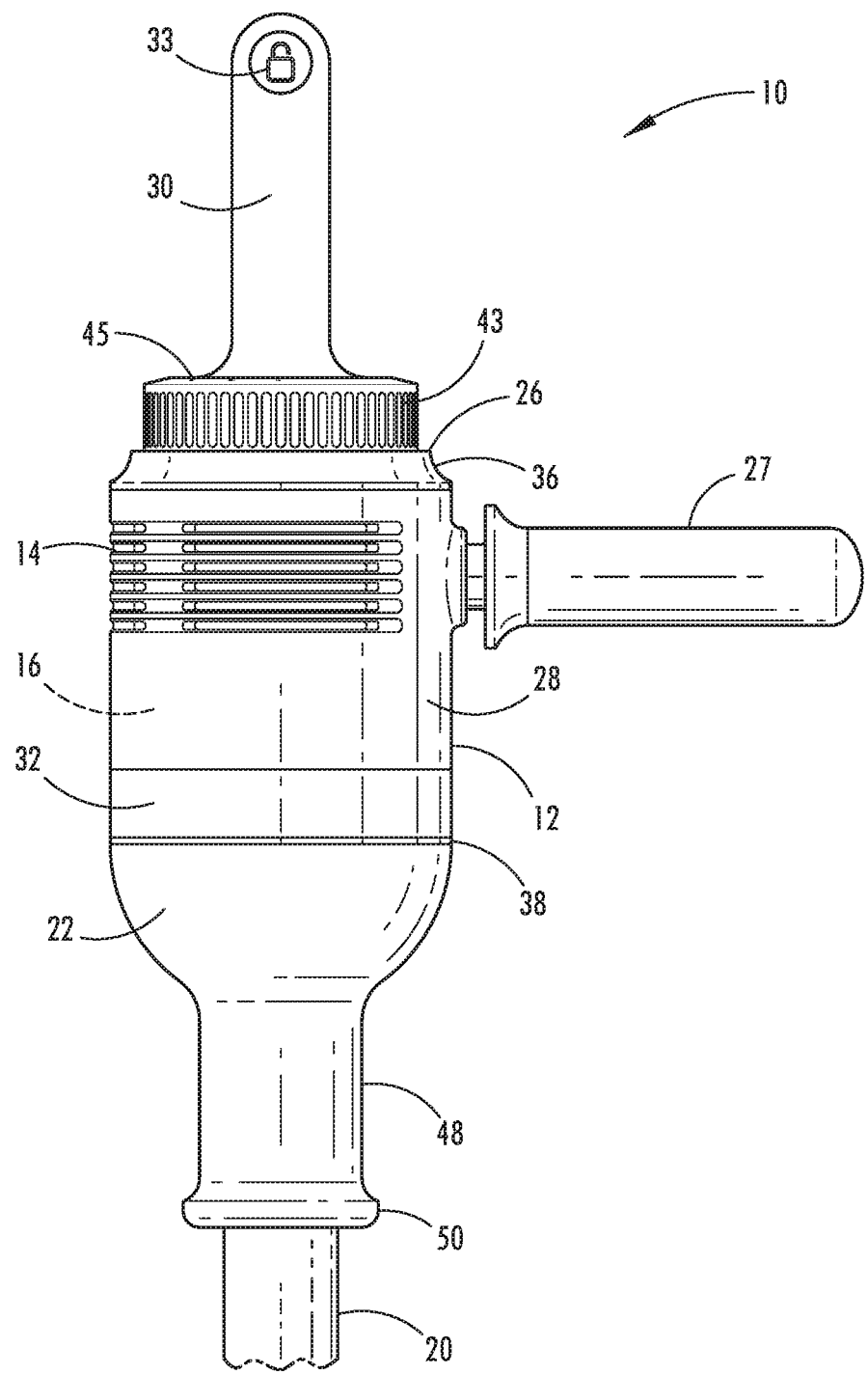
FIG. 6 is an enlarged partial second side elevational view of the upper portion of the immersion blender of FIG. 1.
Figure 7:
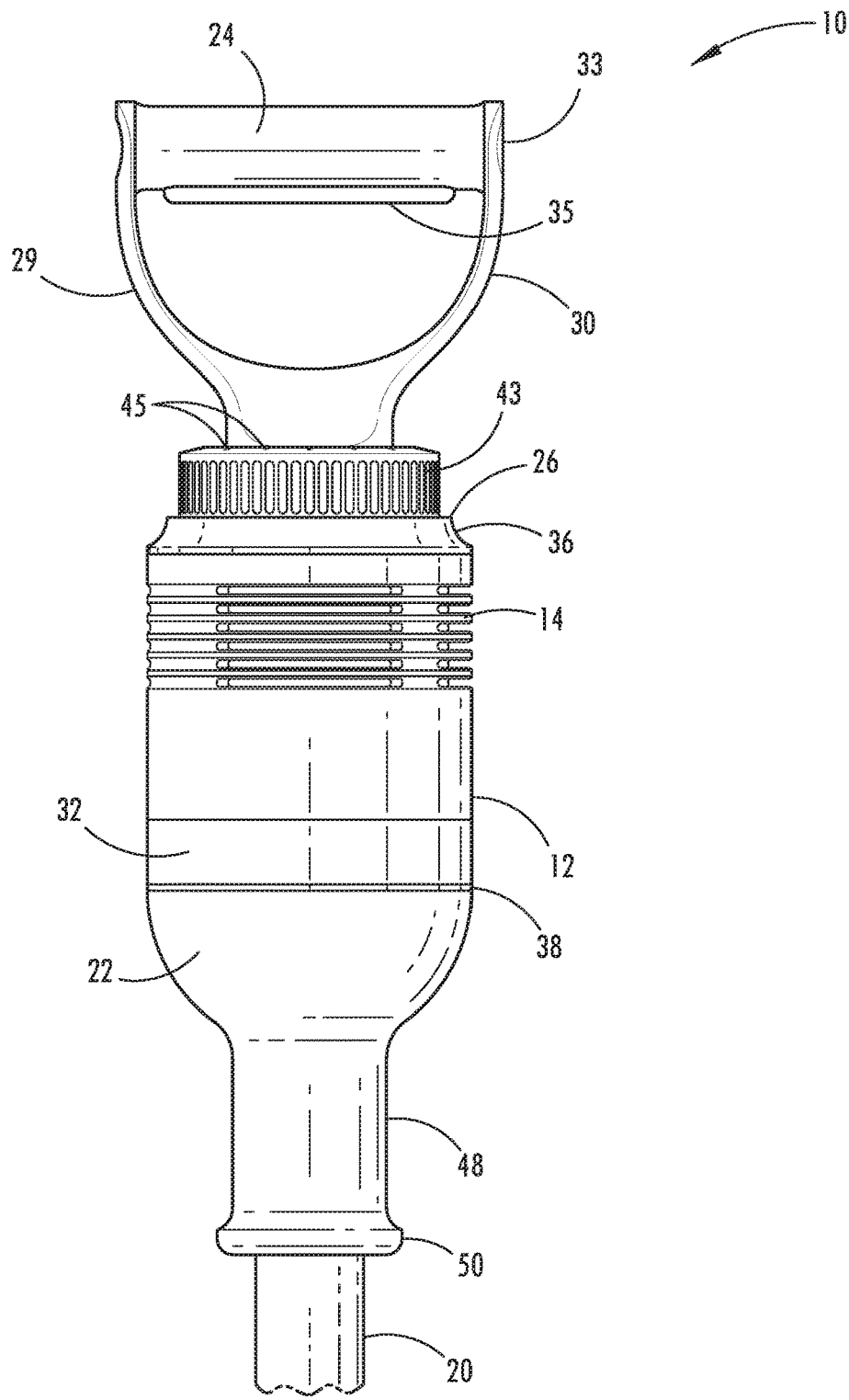
FIG. 7 is an enlarged partial third side elevational view of the upper portion of the immersion blender of FIG. 1.
Figure 8:
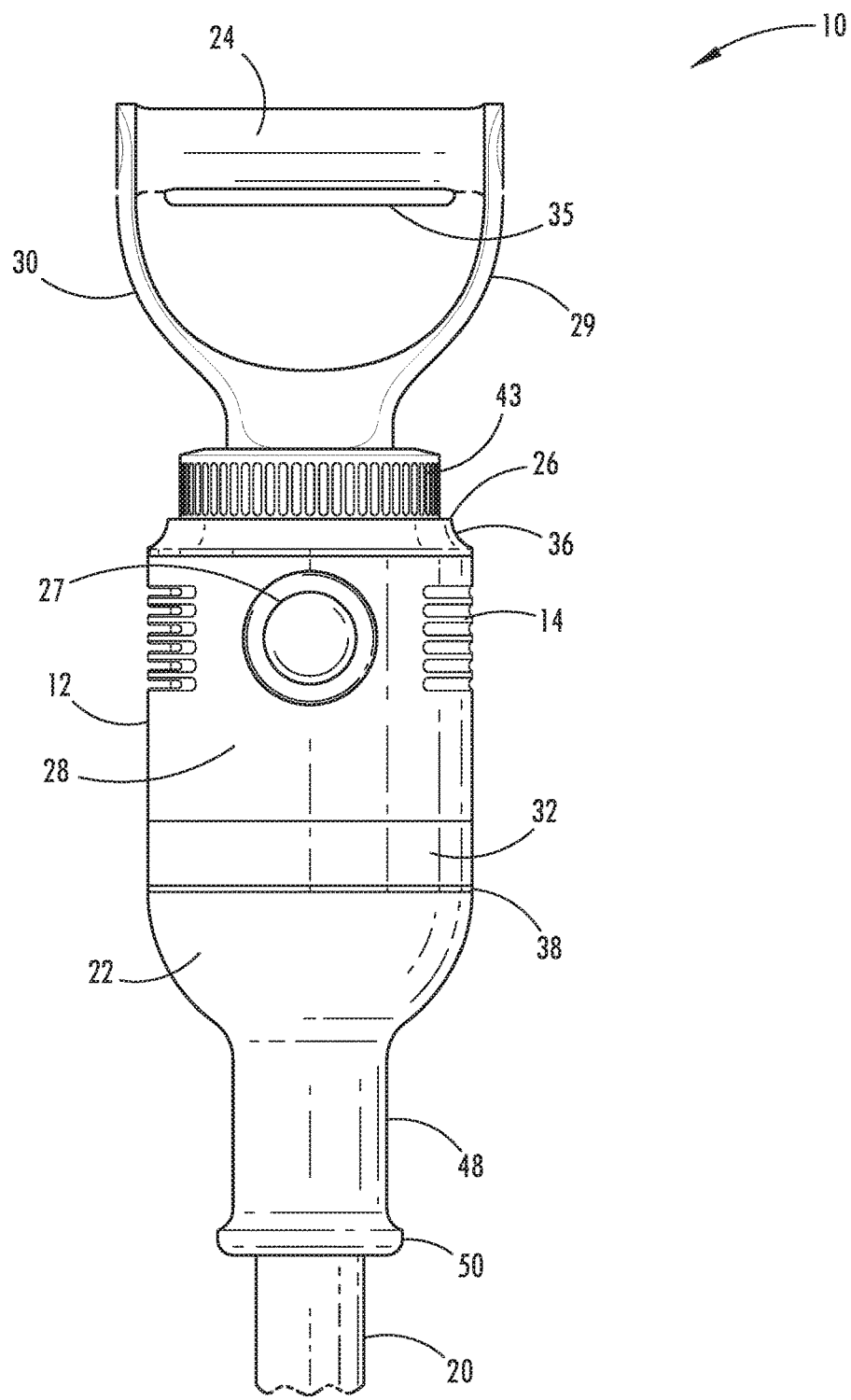
FIG. 8 is an enlarged partial fourth side elevational view of the upper portion of the immersion blender of FIG. 1.
Figure 9:
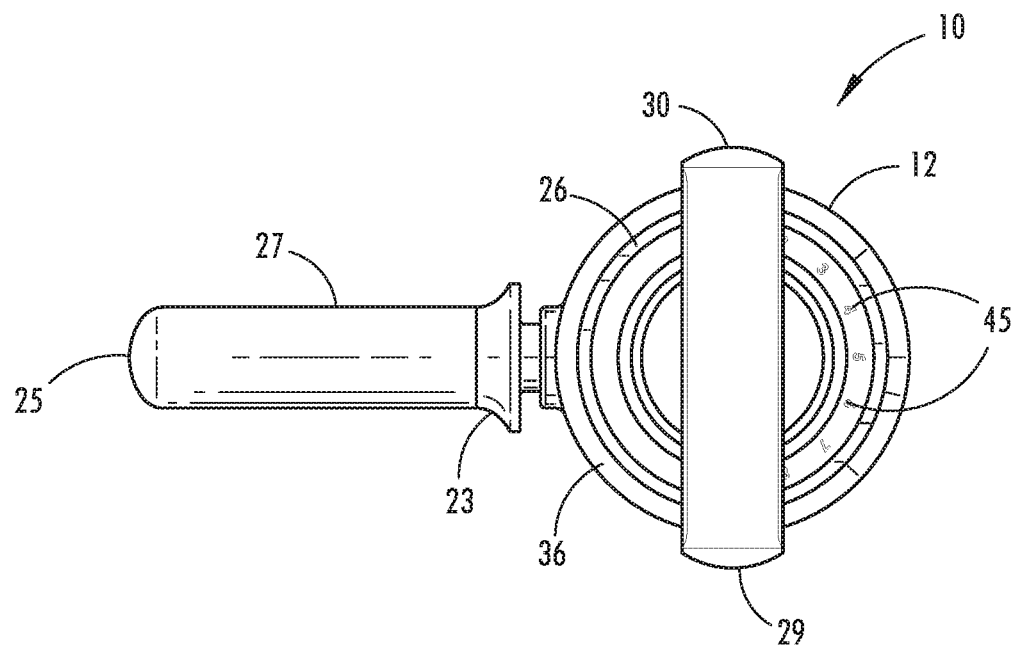
FIG. 9 is a top plan view of the immersion blender of FIG. 1.
Figure 10:
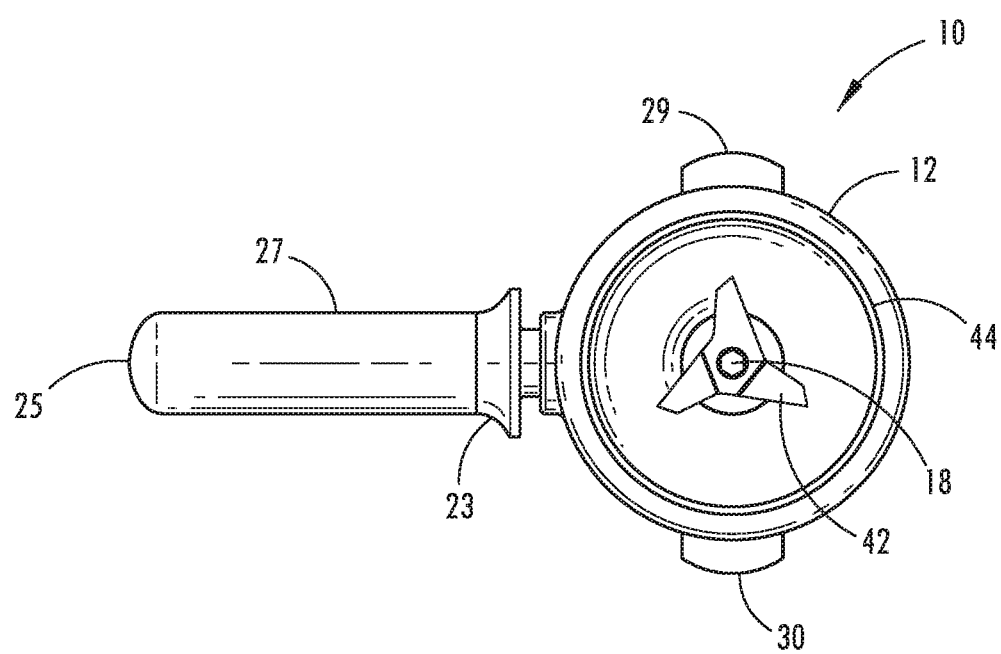
FIG. 10 is a bottom plan view of the immersion blender of FIG. 1.
Figure 11:
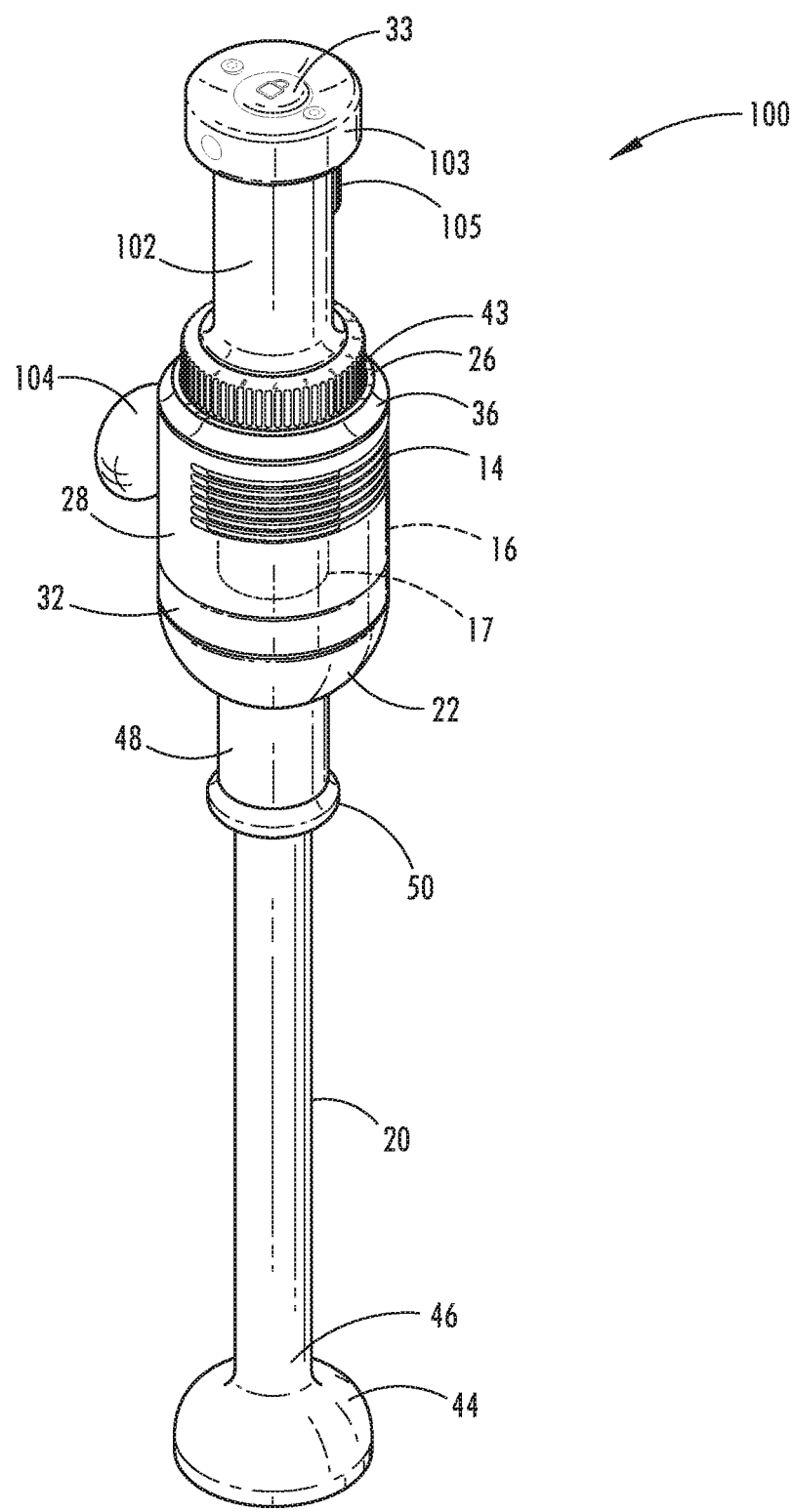
FIG. 11 is a top perspective view of an immersion blender of the present disclosure.
Figure 12:
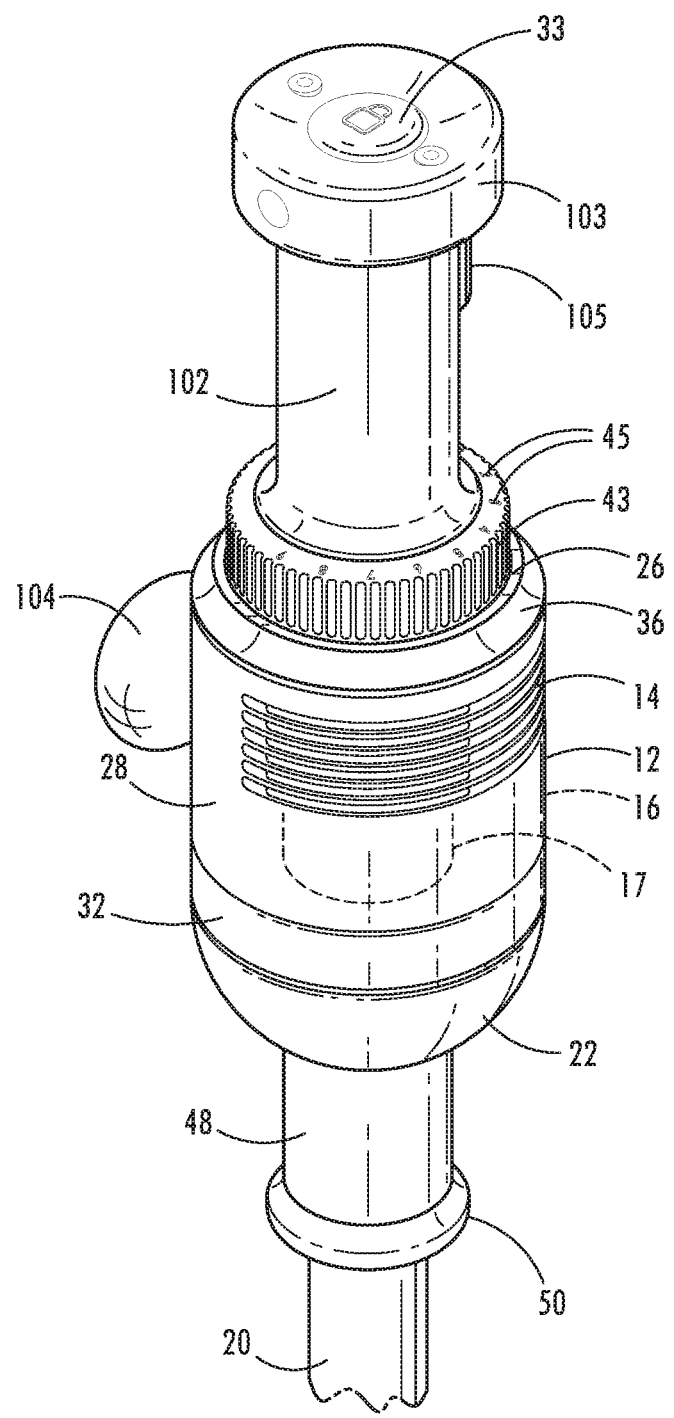
FIG. 12 is an enlarged partial top perspective view of an upper portion of the immersion blender of FIG. 11.
Figure 13:
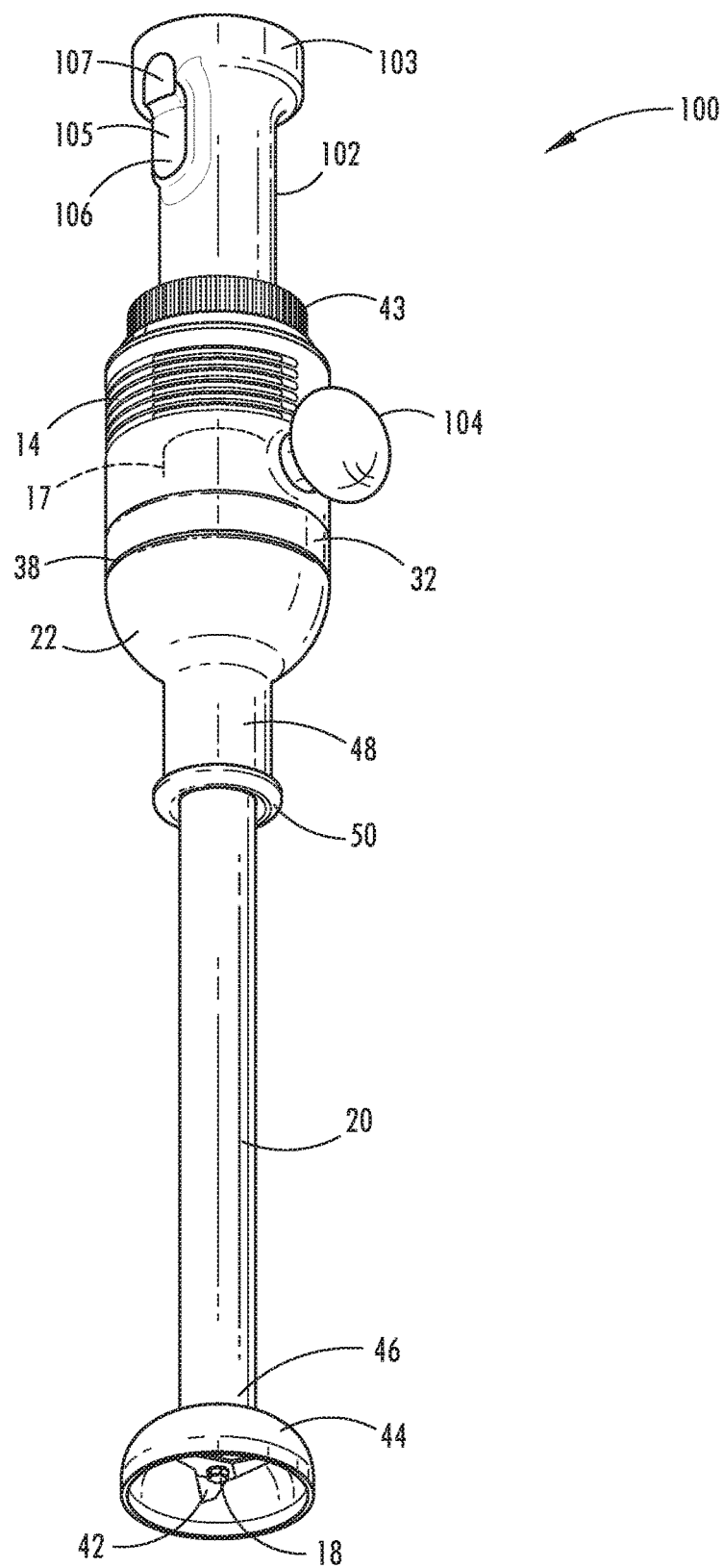
FIG. 13 is a bottom perspective view of the immersion blender of FIG. 11.
Figure 14:
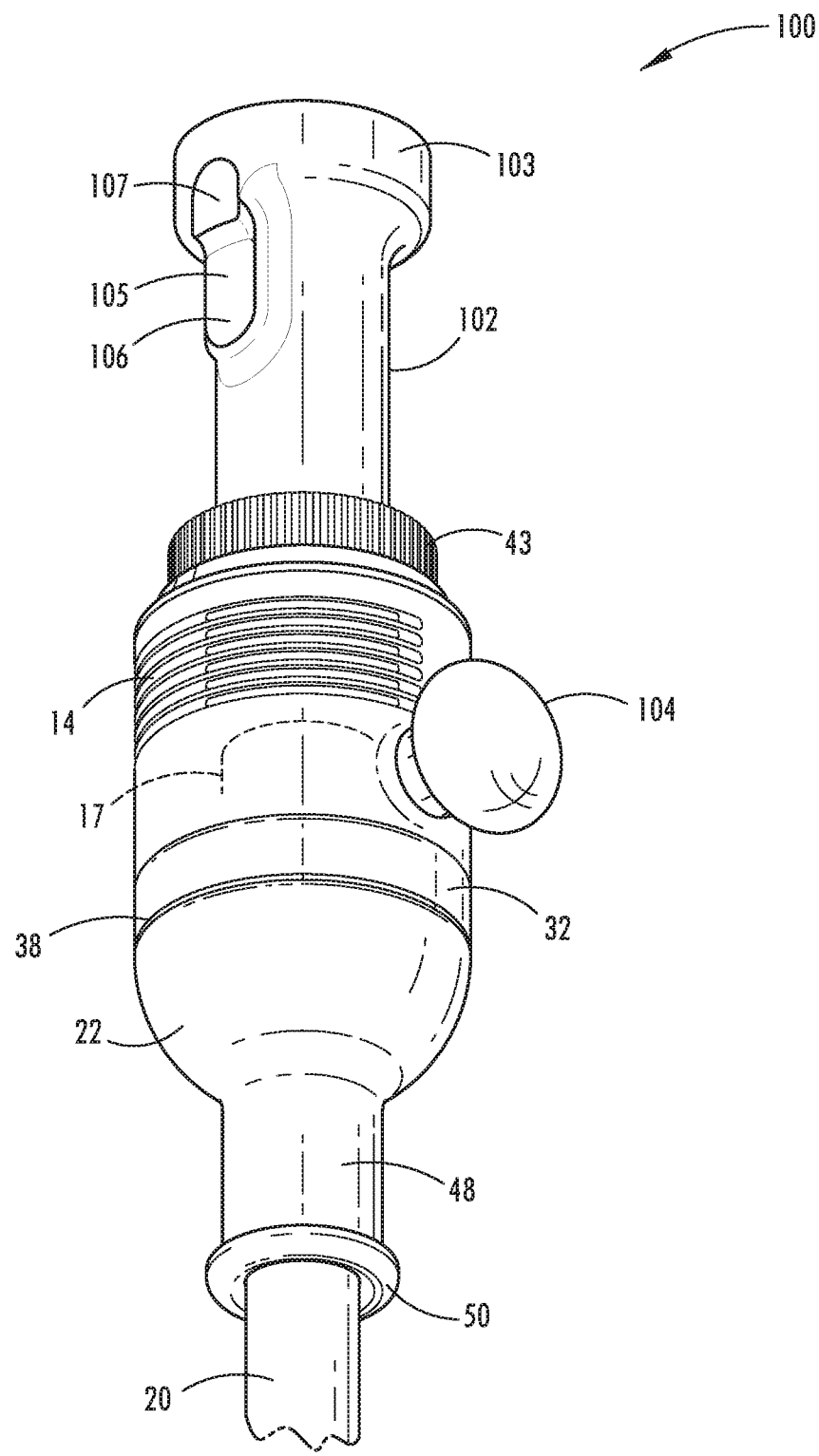
FIG. 14 is an enlarged partial bottom perspective view of the upper portion of the immersion blender of FIG. 11.
Figure 15:
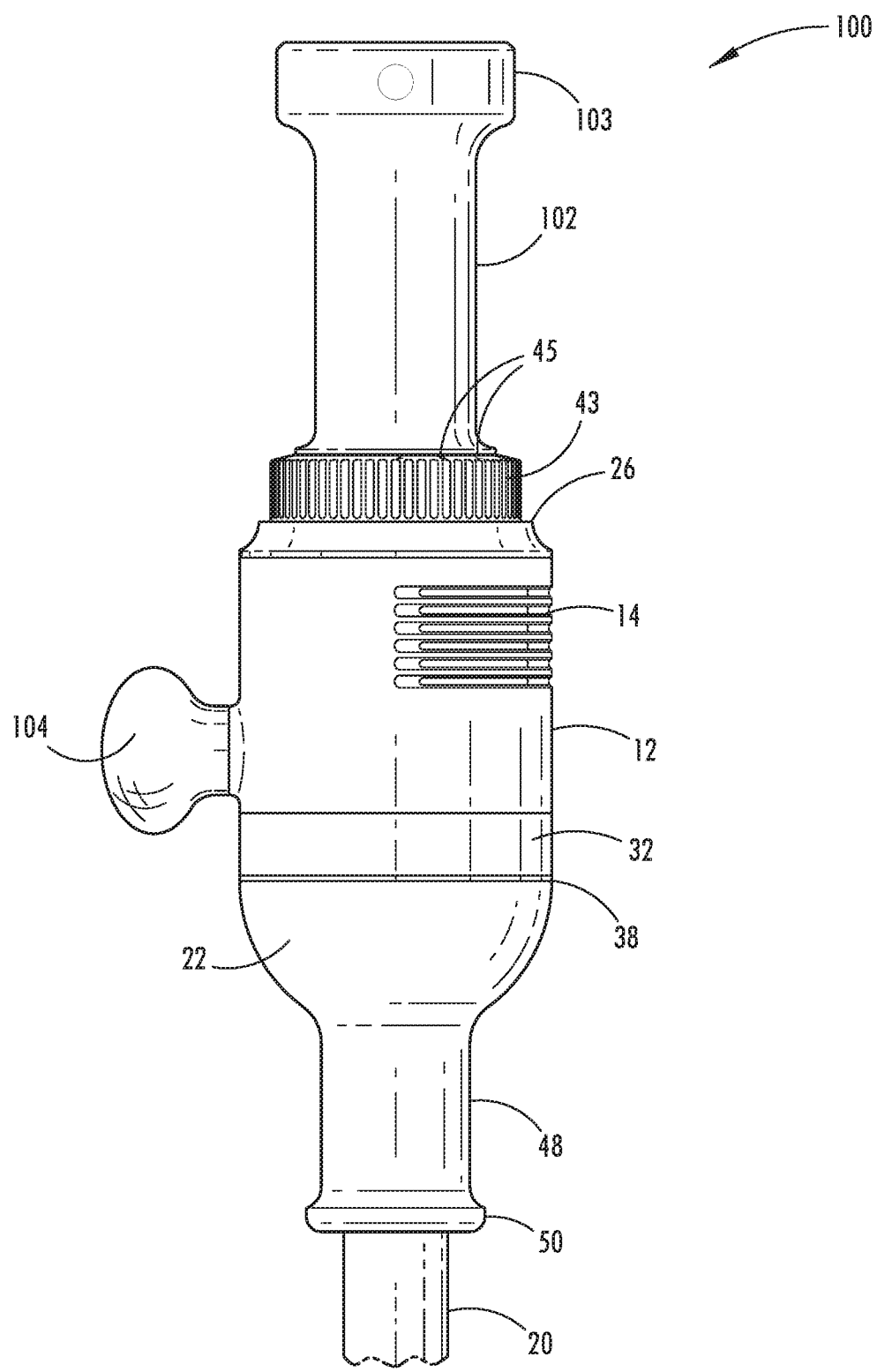
FIG. 15 is an enlarged partial first side elevational view of the upper portion of the immersion blender of FIG. 11.
Figure 16:
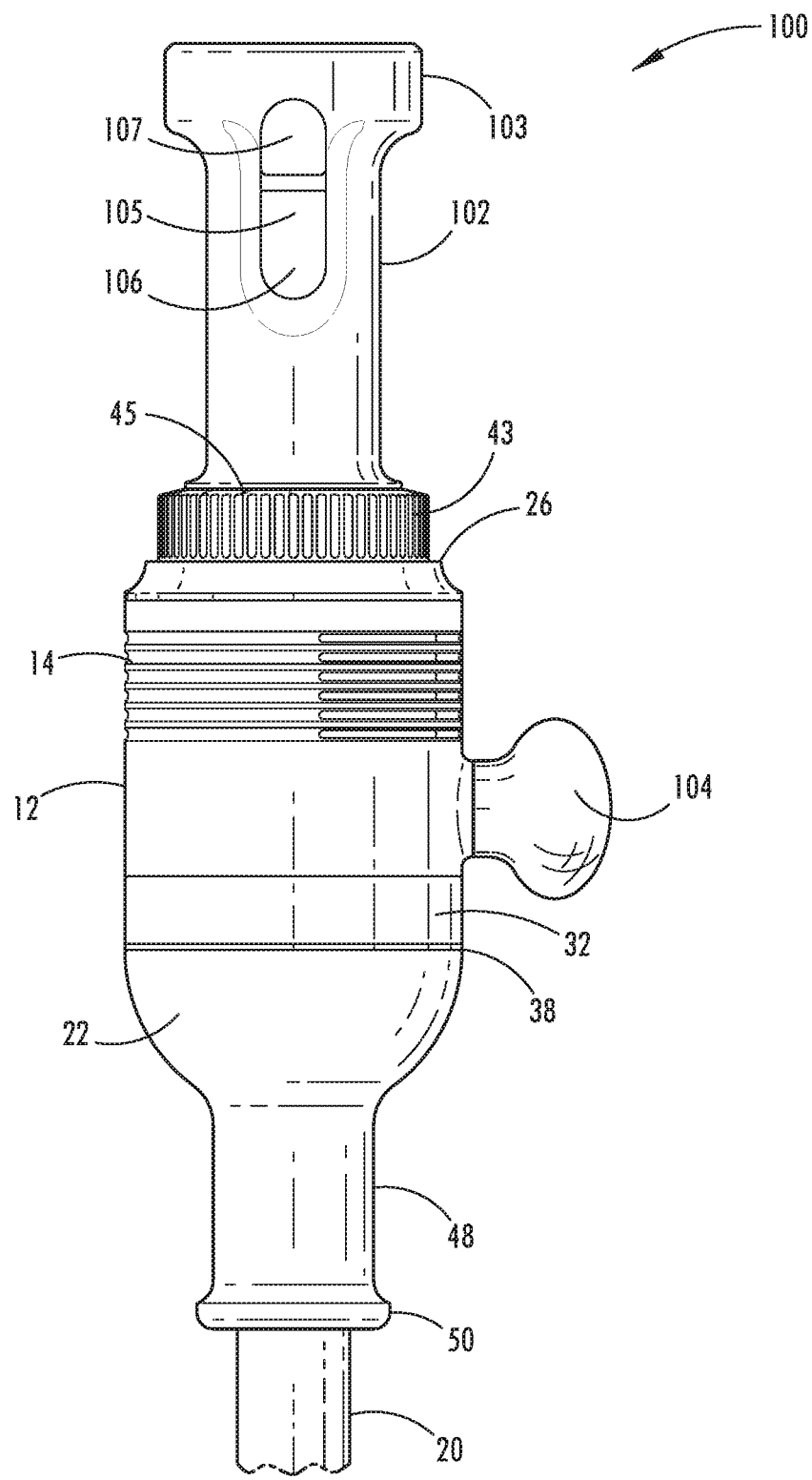
FIG. 16 is an enlarged partial second side elevational view of the upper portion of the immersion blender of FIG. 11.
Figure 17:
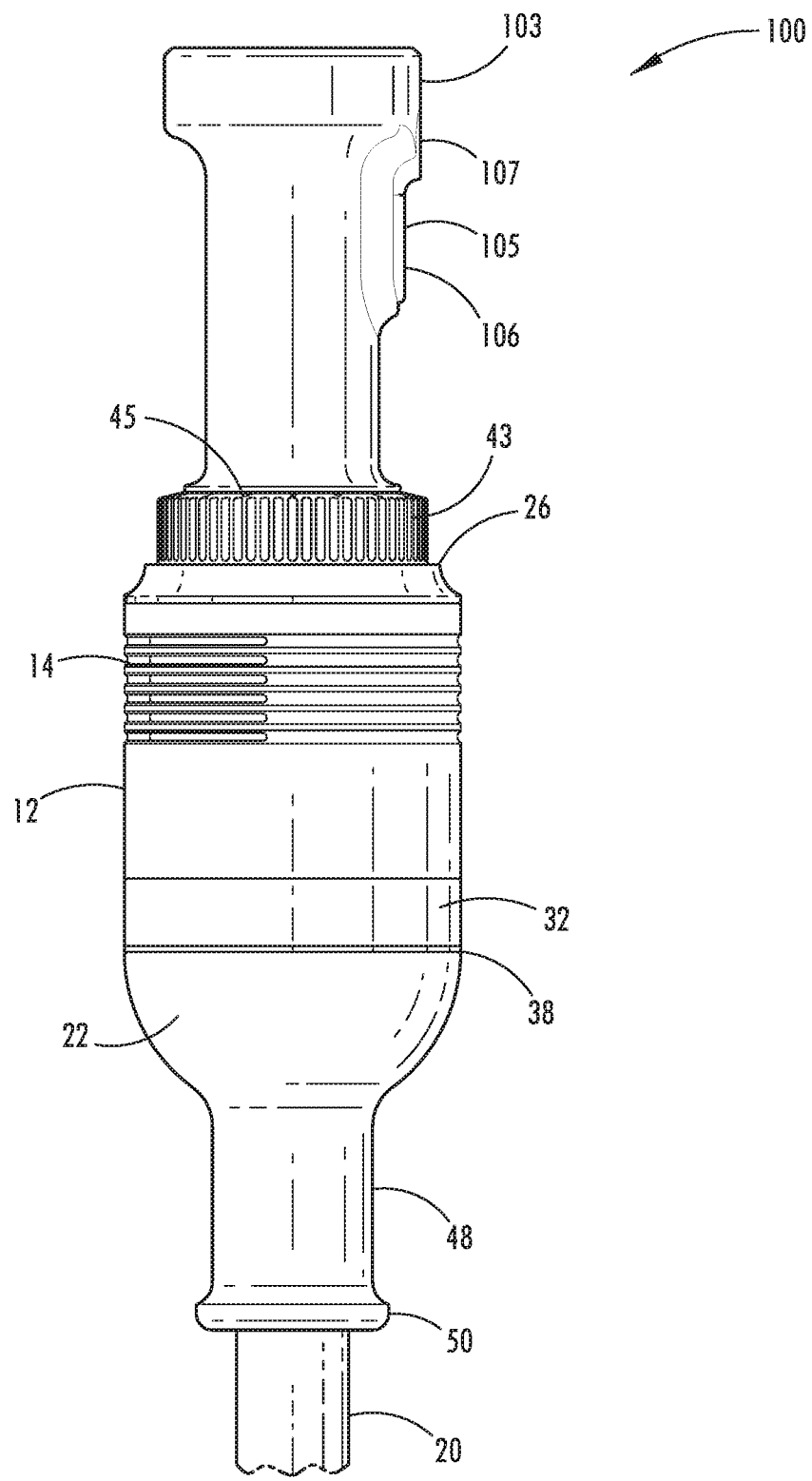
FIG. 17 is an enlarged partial third side elevational view of the upper portion of the immersion blender of FIG. 11.
Figure 18:
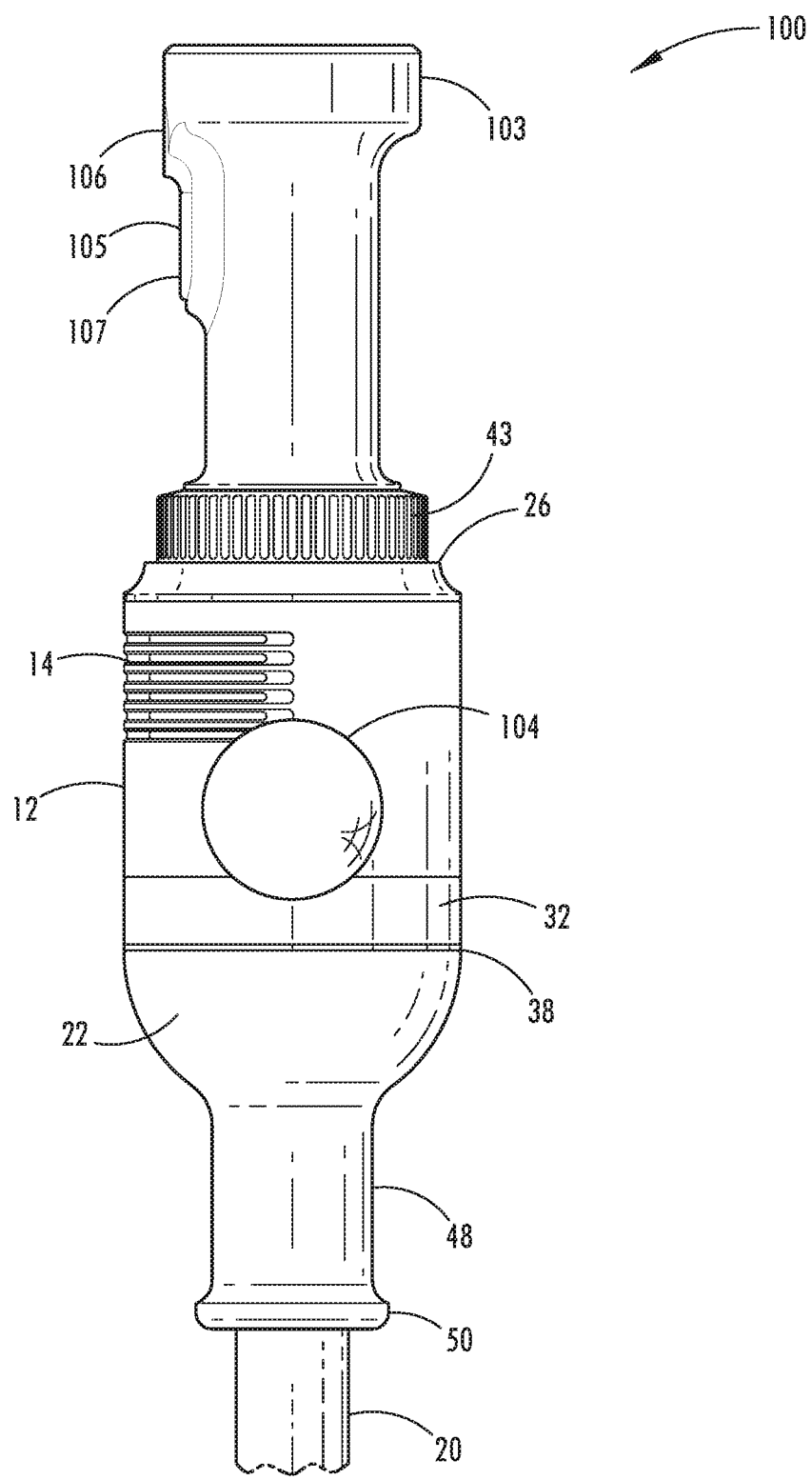
FIG. 18 is an enlarged partial fourth side elevational view of the upper portion of the immersion blender of FIG. 11.
Figure 19:
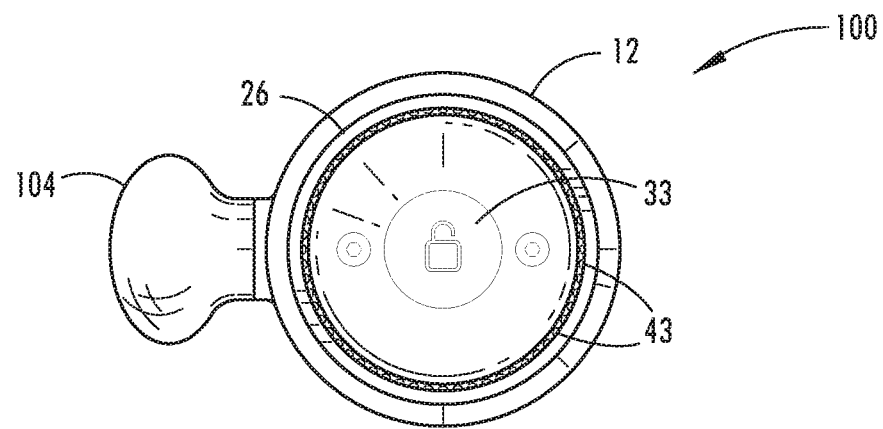
FIG. 19 is a top plan view of the immersion blender of FIG. 11.
Figure 20:
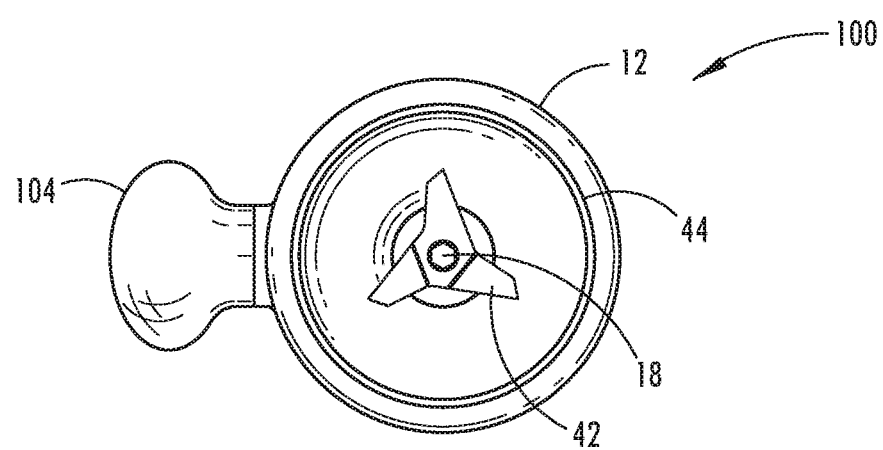
FIG. 20 is a bottom plan view of the immersion blender of FIG. 11.
Figure 21:
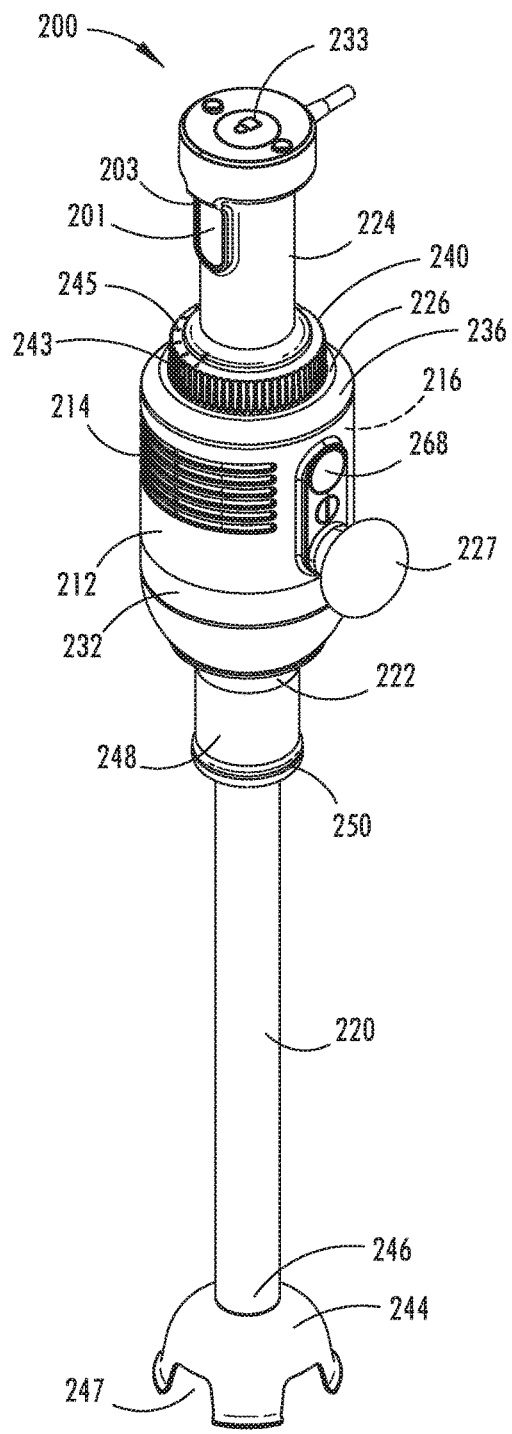
FIG. 21 is a first side perspective view of an immersion blender of the present disclosure.
Figure 22:
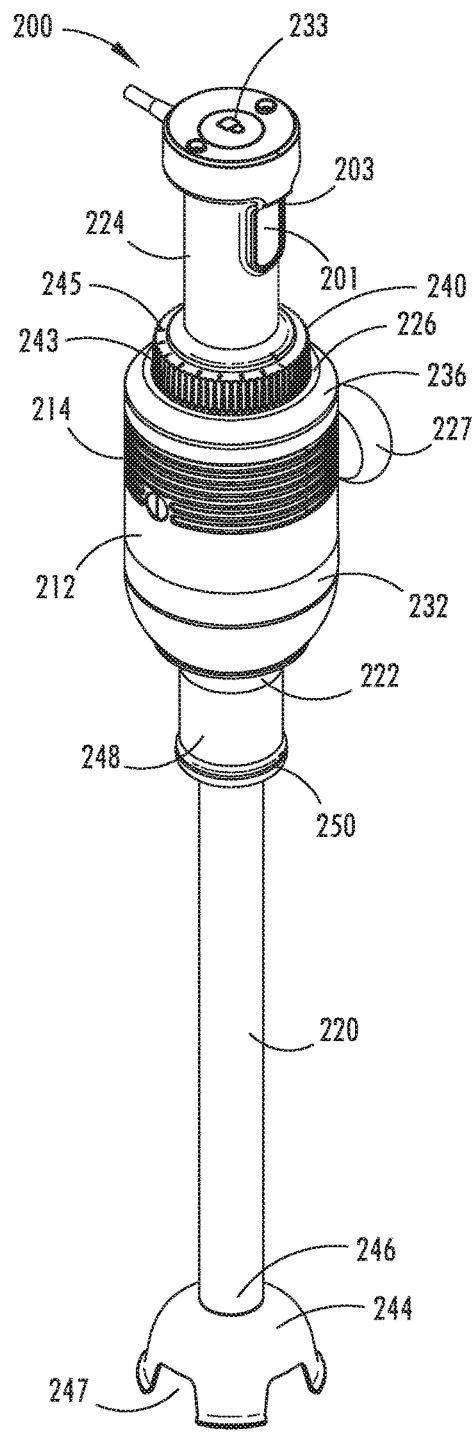
FIG. 22 is a second side perspective view of the immersion blender of FIG. 21.
Figure 23:
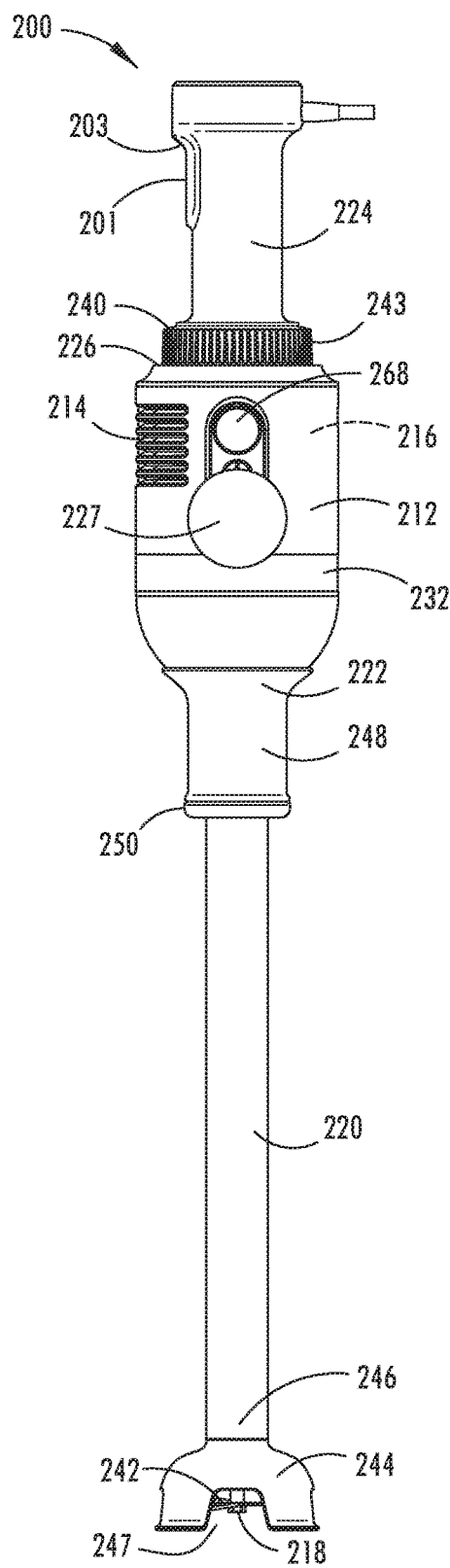
FIG. 23 is a first side elevational view of the immersion blender of FIG. 21.
Figure 24:
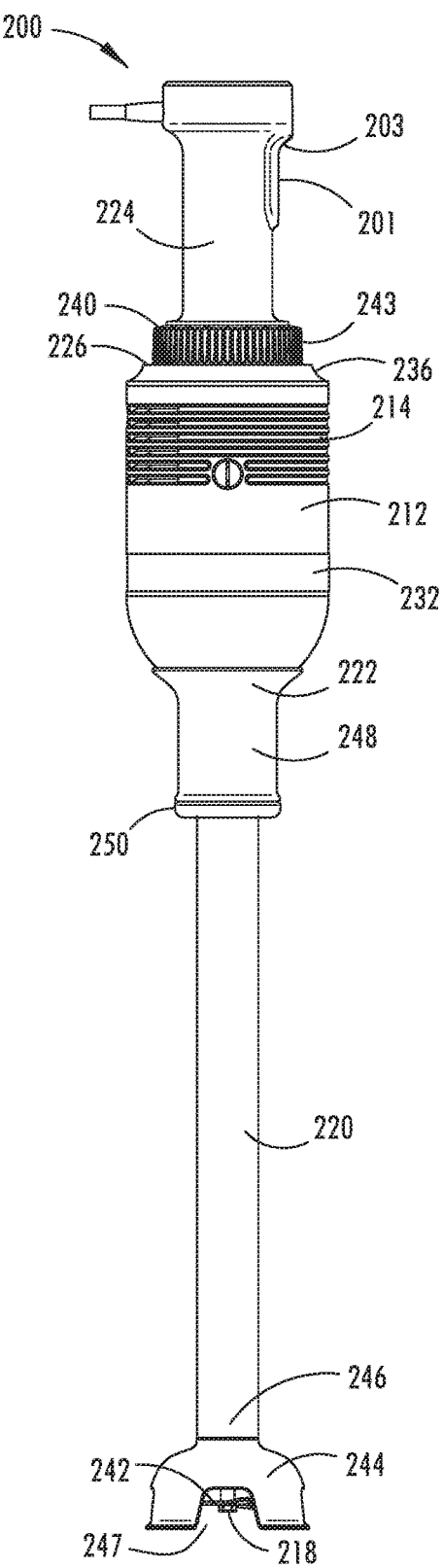
FIG. 24 is a second side elevational view of the immersion blender of FIG. 21.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-45, reference numeral 10 generally designates a mixing device having a housing 12 defining a plurality of lateral vents 14. The housing 12 defines an inner chamber 16 configured to support a motor 17. A shaft 18 is operably coupled with the motor 17 and is configured for rotation. A shaft cover 20 is operably coupled with a first end 22 of the housing 12 and extends around a longitudinal extent of the shaft 18. A top handle 24 is disposed on a second end 26 of the housing 12. A side handle 27 is operably coupled with and extends from a side 28 of the housing 12. The side handle 27 includes a flange 23 defining a flared connecting end and a rounded distal end 25.

The mixing device 10 is generally configured for use with a mixing bowl or other such container containing a material for mixing. The top handle 24 and side handle 27 of the mixing device 10 are configured to provide gripping positions for a user, such that stability of the mixing device 10 can be maintained while the mixing device 10 is in operation. In the embodiment illustrated in FIGS. 1-10, the top handle 24 includes a generally Y-shaped construction with first and second supports 29, 30 extending upwardly from the housing 12. A cross bar 31 extends laterally between the first and second supports 29, 30. A power on/off button 33 may be disposed proximate the top handle 24 to prevent the shaft 18 from turning. The side handle 27 may be removably secured with the housing 12 via a mechanical fastening arrangement, such as via a threaded interference fit connection, a snap-in connection, a magnetic connection, a friction fit connection, etc. The top handle 24 may also include a downwardly extending bulbous ridge 35 (FIG. 4) to provide gripping comfort to a user. Alternatively, the ridge 35 may act as a pressure sensitive on/off switch or pulse switch.

With reference to FIGS. 1-10, the side handle 27 includes a generally elongate configuration. The side handle 27 may include a textured or knurled surface that allows a user to more securely grip the side handle 27. In addition, the housing 12 includes a band 32 that extends around the housing 12 proximate the first end 22 or lower portion of the housing 12. The band 32 may be constructed from metal, plastic, etc., and may be purely cosmetic or may provide structural support to the housing 12. A gasket 38 is positioned below the band 32. Further, the plurality of vents 14 disposed on the housing 12 are oriented in a horizontal or lateral orientation around a substantial portion of the housing 12. The plurality of vents 14 act to air cool internal components of the mixing device 10. As illustrated, the housing 12 also includes the second end 26 or upper portion proximate the top handle 24. The upper portion of the housing 12 includes a smaller width than the lower portion or a chamfered side edge 36. In addition, the upper portion includes an adjustable dial 40 configured to adjust the speed of rotation of the shaft 18, and consequently, the speed of rotation of a blade 42 (FIGS. 3 and 10) disposed at the end of the shaft 18. The adjustable dial 40 includes a plurality of vertically oriented gripping ribs 43. The gripping ribs 43 provide increased frictional resistance which results in a more easily turned dial 40. Indicia 45 are disposed on the adjustable dial 40 to indicate to the user various speed settings.

With reference again to FIGS. 1-3, the blade 42 is covered by a downwardly turned cup portion 44 that is disposed on a distal end 46 of the shaft cover 20. A shaft cover support 48 extends downwardly from the lower portion of the housing 12 and is secured with the shaft cover 20. The shaft cover support 48 provides additional rigidity at the interface where the shaft cover 20 is received into the housing 12. The shaft cover support 48 also includes an outwardly turned flange 50 proximate the distal end 46.

With reference now to FIGS. 11-20, a mixing device 100 includes similar features to the mixing device 10 disclosed above in relation to FIGS. 1-10, but includes a top handle 102 that is concentrically aligned with the shaft cover 20 and has a widened distal end 103. The top handle 102 includes a protuberance 105 that could serve as an additional grip, a pulse button, or both. It is also contemplated that the protuberance 105 may include two buttons that control functionality of the mixing device 100. A lower button 106 that acts as a start trigger or pulse button to actuate the mixing device 100, which results in rotation of the shaft 18 and the blade 42, and also an upper button 107 that, once the lower button 106 is depressed, acts as a continuous run button. Accordingly, a user can effectively keep the mixing device 100 operating without having to continually apply pressure to the lower button 106. In addition, the mixing device 100 includes a side handle 104 having a bulbous knob-like configuration. This construction is less bulky than the construction shown with reference to FIGS. 1-10 above. However, many of the features are similar or the same as those set forth above.

Notably, in FIGS. 1-20 in each of the configurations, the mixing devices 10, 100 may include a locking feature on the top handle. This construction allows for the mixing devices 10, 100 to be locked, such that the blade 42 will not operate absent user intervention.

Figure 45:
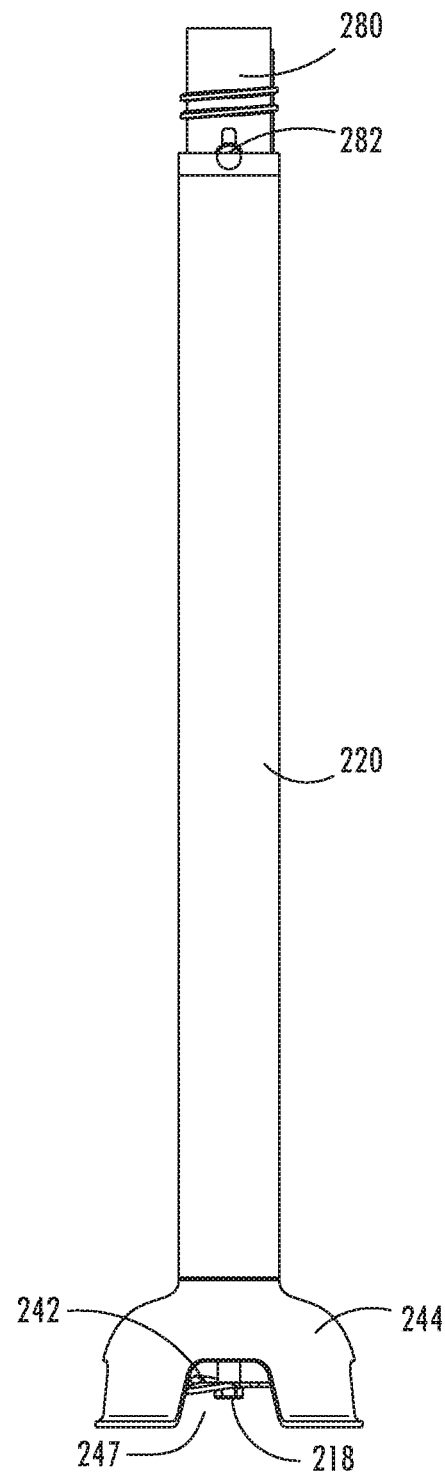
FIG. 45 is a side elevational view of a drive shaft of an immersion blender of the present disclosure after removal from the housing.

With reference now to FIGS. 21-32, reference numeral 200 generally designates an immersion blender or mixing device having an operating state in which a user can press a pulse button 201 disposed on top of the immersion blender 200 without having to reset through an on/off switch, as disclosed in further detail herein. An upper button 203, which may be a continuous on or on/off switch, is disposed above the pulse button 201. The immersion blender 200 includes a housing 212 defining a plurality of vents 214. The housing 212 defines an inner chamber 216 configured to support a motor 217. The motor 217 may be powered by another power source, or may receive electrical power from an electrical cord operably coupled with the mixing device 200 at, for example, an upper handle. A shaft 218 is operably coupled with the motor 217 and is configured for rotation. A shaft cover 220 is operably coupled with a first end 222 of the housing 212 and extends around a longitudinal extent of the shaft 218. A top handle 224 is disposed on a second end 226 of the housing 212. The top handle 224 extends from the housing 212 in a direction away from, but concentrically aligned with, the shaft cover 220. A side handle 227 is operably coupled with and extends from a side of the housing 212. The shaft 218 and shaft cover 220 are removable, as shown in FIG. 45.

The mixing device 200 is generally configured for use with a mixing bowl or other such container containing a material for mixing. The top handle 224 and side handle 227 of the mixing device 200 are configured to provide gripping positions for a user, such that stability of the mixing device 200 can be maintained while the mixing device 200 is in operation. In the embodiment illustrated in FIGS. 21-32, the top handle 224 includes a generally elongate construction extending upwardly from the housing 212. A power on/off button 233 may be disposed on a top end of the top handle 224. The power on/off button 233 is a switch that provides power via an electrical cord to the mixing device 200 so that the mixing device 200 can operate. The side handle 227 may be removably secured with the housing 212 via a mechanical fastening arrangement, such as via a threaded interference fit connection, a snap-in connection, a magnetic connection, a friction fit connection, etc. The top handle 224 extends away from the housing 212 and may be generally concentrically aligned with the housing 212.

Figure 31A:
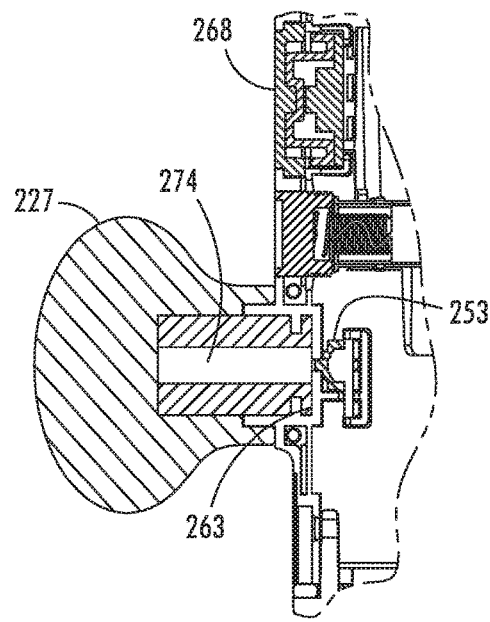
FIG. 31A is an enlarged side cross-sectional view of a type of handle of an immersion blender of the present disclosure.
Figure 31B:
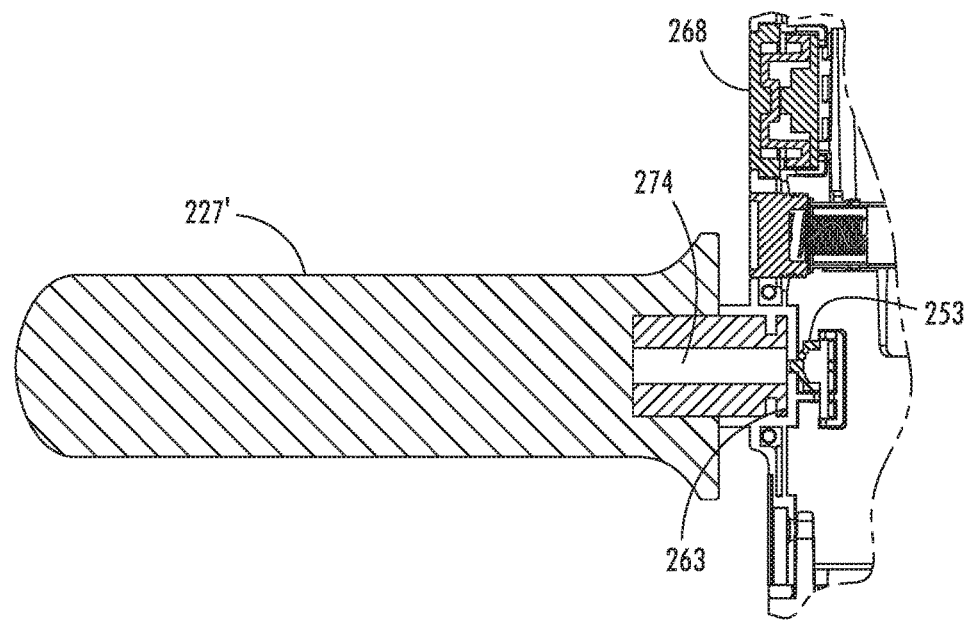
FIG. 31B is an enlarged side cross-sectional view of another type of handle of an immersion blender of the present disclosure.
Figure 32A:
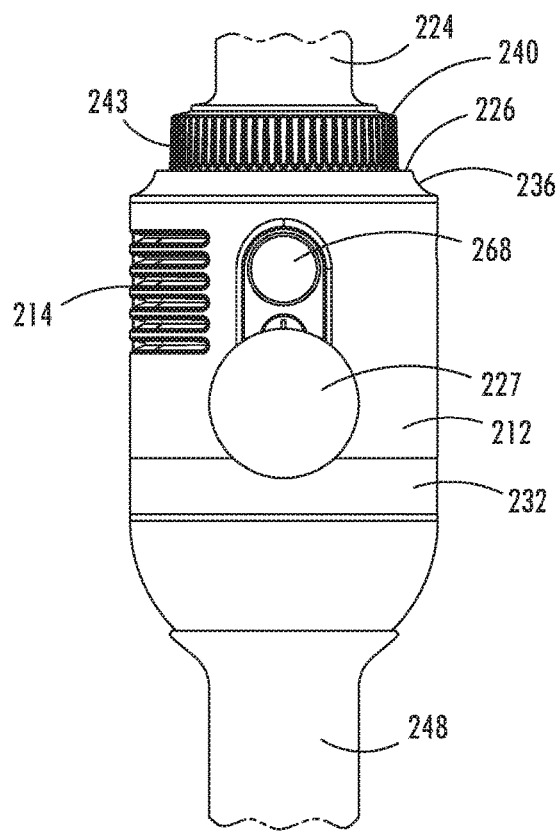
FIG. 32A is an enlarged side elevational view of a handle of the present disclosure
Figure 32B:
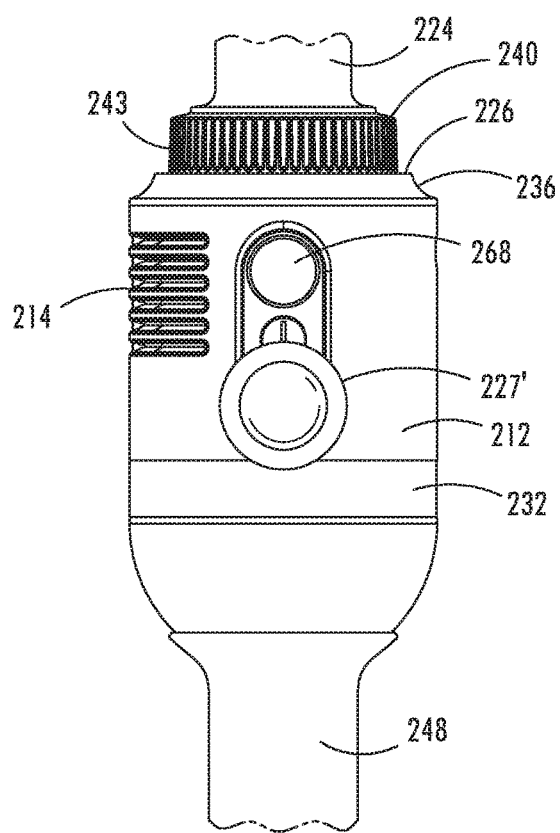
FIG. 32B is an enlarged side elevational view of another handle of the present disclosure.
Figure 33:
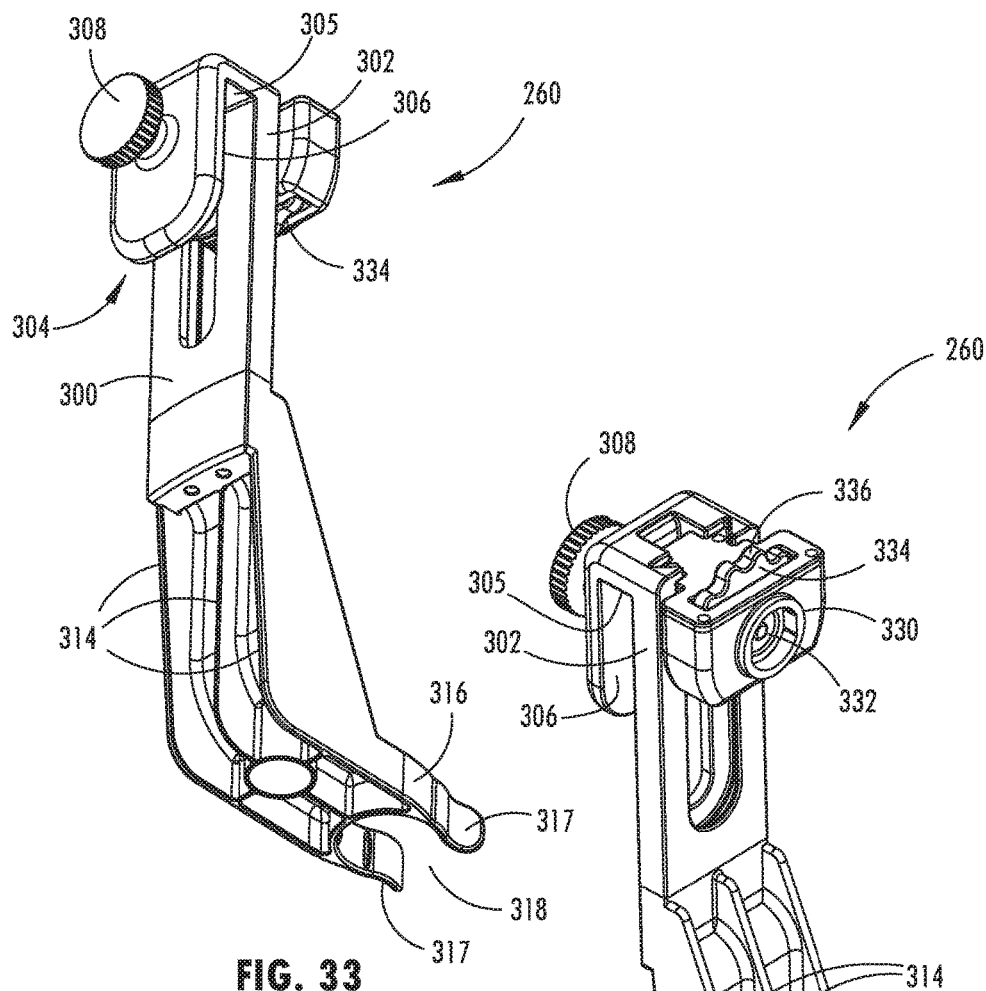
FIG. 33 is a front bottom perspective view of a bowl clamp of the present disclosure.
Figure 34:
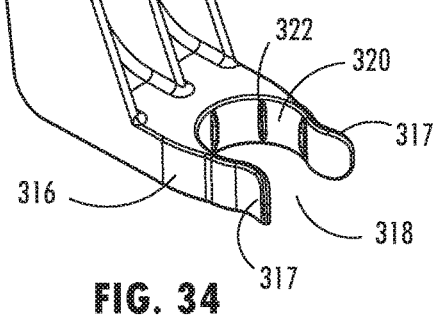
FIG. 34 is a rear top perspective view of the bowl clamp of FIG. 33.

With reference again to FIGS. 21-32A, and 32B, the side handle 227 may include a generally bulbous configuration (FIGS. 31A and 32A) or include a generally elongate configuration (FIGS. 31B and 32B). In addition, the housing 212 includes a band 232 that extends around the housing 212 proximate the first end 222 or lower portion of the housing 212. Further, the plurality of vents 214 disposed on the housing 212 are oriented in a horizontal or lateral orientation around a substantial portion of the housing 212. As illustrated, the housing 212 also includes the second end 226 or upper portion proximate the top handle 224. The upper portion of the housing 212 includes a smaller width than the lower portion or a chamfered side edge 236. In addition, the upper portion includes an adjustable dial 240 configured to adjust the speed of rotation of the shaft 218, and consequently, a blade 242 disposed at the end of the shaft 218. The adjustable dial 240 includes a plurality of vertically oriented gripping ribs 243. Indicia 245 are disposed on the adjustable dial 240 to indicate to the user various speed settings. The blade 242 is covered by a downwardly turned cup portion 244 that is disposed on a distal end 246 of the shaft cover 220. The cup portion 244 is illustrated with a plurality of slots 247 that aid in flowing material to be mixed toward the blade 242. A shaft cover support 248 extends downwardly from the lower portion of the housing 212 and is secured with the shaft cover 220. The shaft cover support 248 includes a supportive flange 250 proximate the distal end 246. The supportive flange 250 may include decorative designs and a more robust construction to firmly secure the removable shaft cover 220 when disposed therein.

Figure 25:
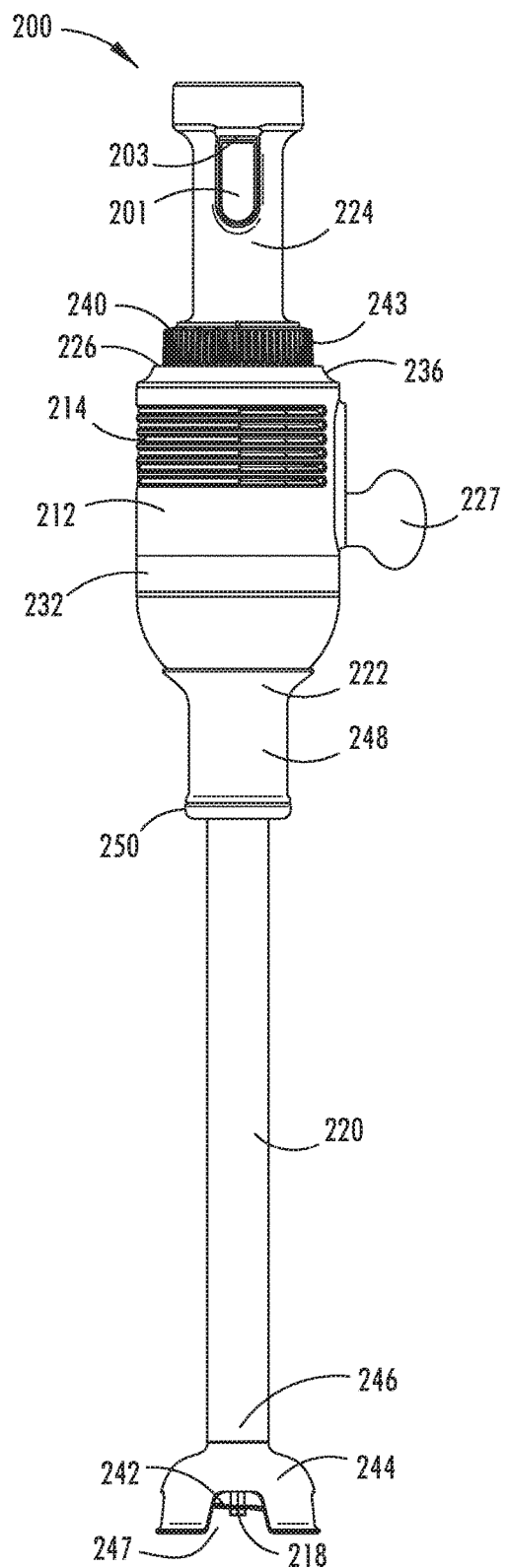
FIG. 25 is a front elevational view of the immersion blender of FIG. 21.
Figure 26:
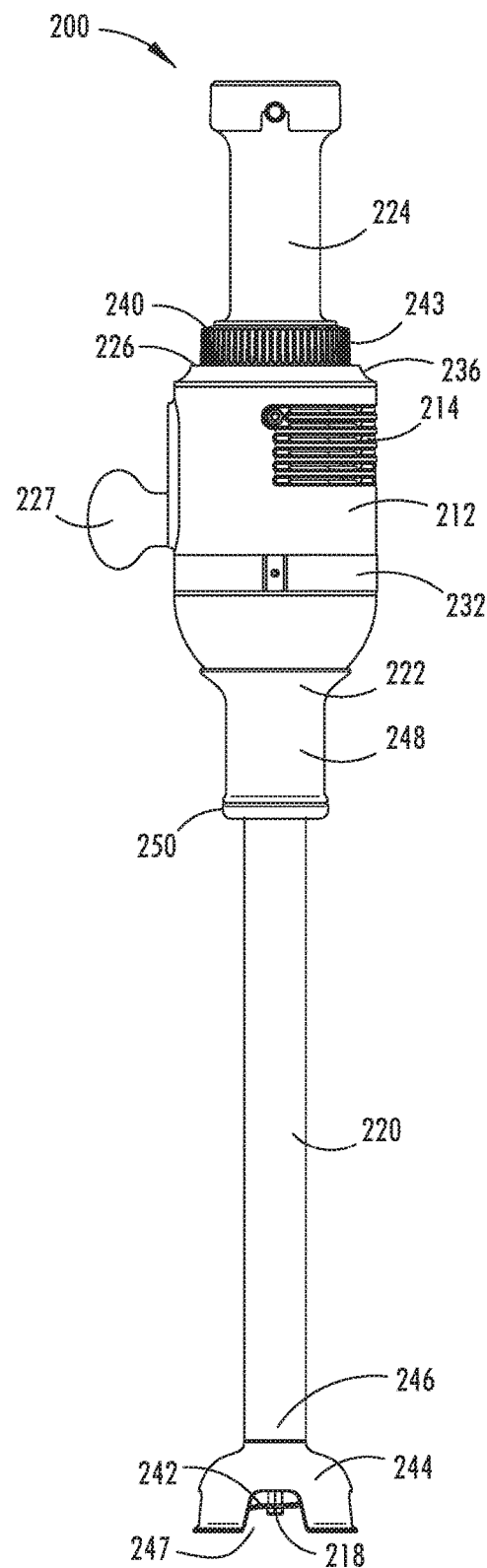
FIG. 26 is a rear elevational view of the immersion blender of FIG. 21.
Figure 27:
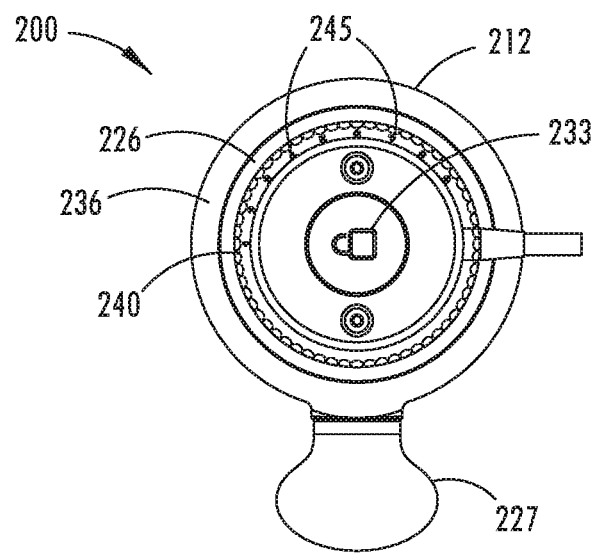
FIG. 27 is a top plan view of the immersion blender of FIG. 21.
Figure 28:
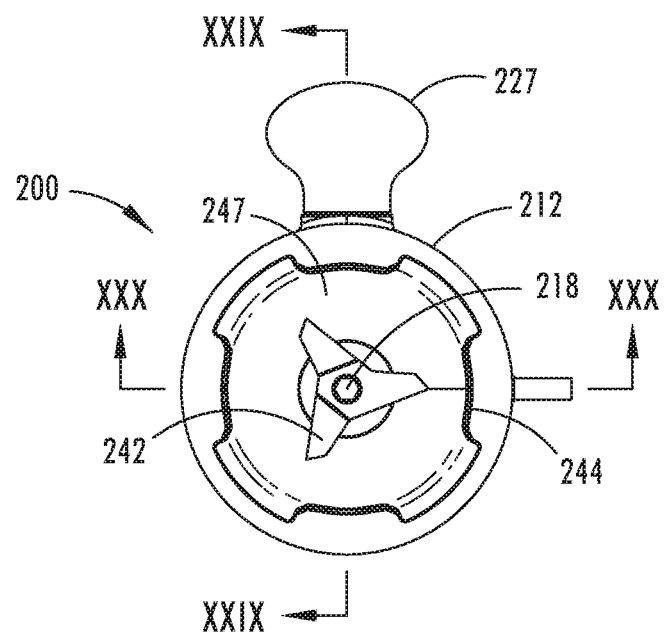
FIG. 28 is a bottom plan view of the immersion blender of FIG. 21.
Figure 29:
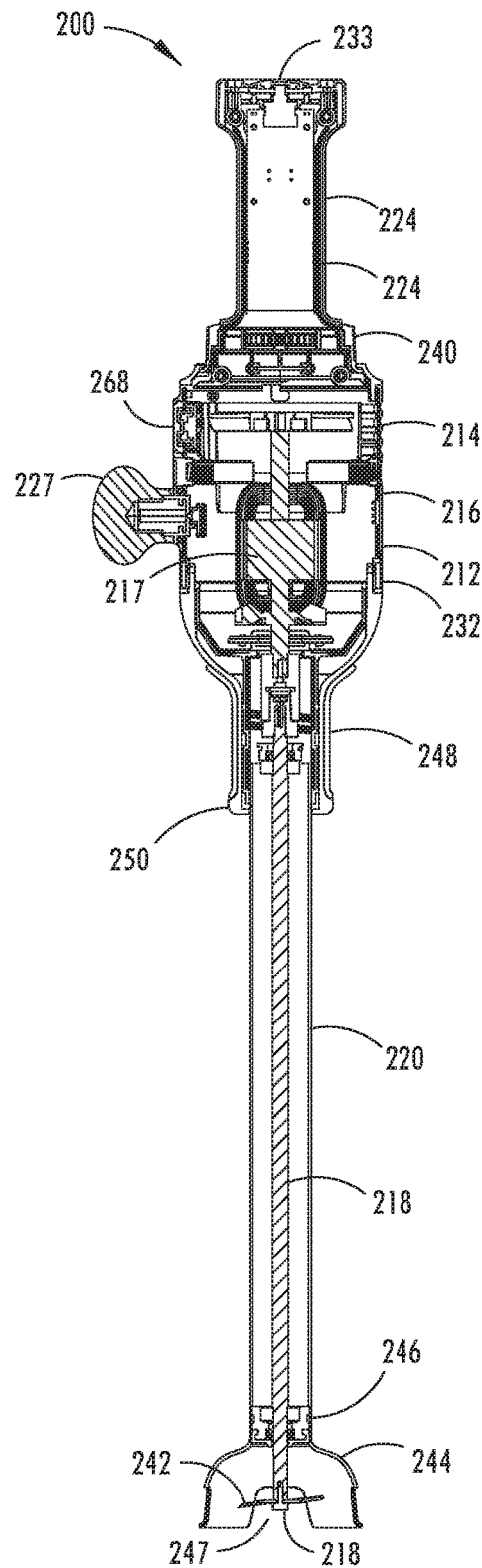
FIG. 29 is a side cross-sectional elevational view of the immersion blender of FIG. 21 taken at line A-A.
Figure 30:
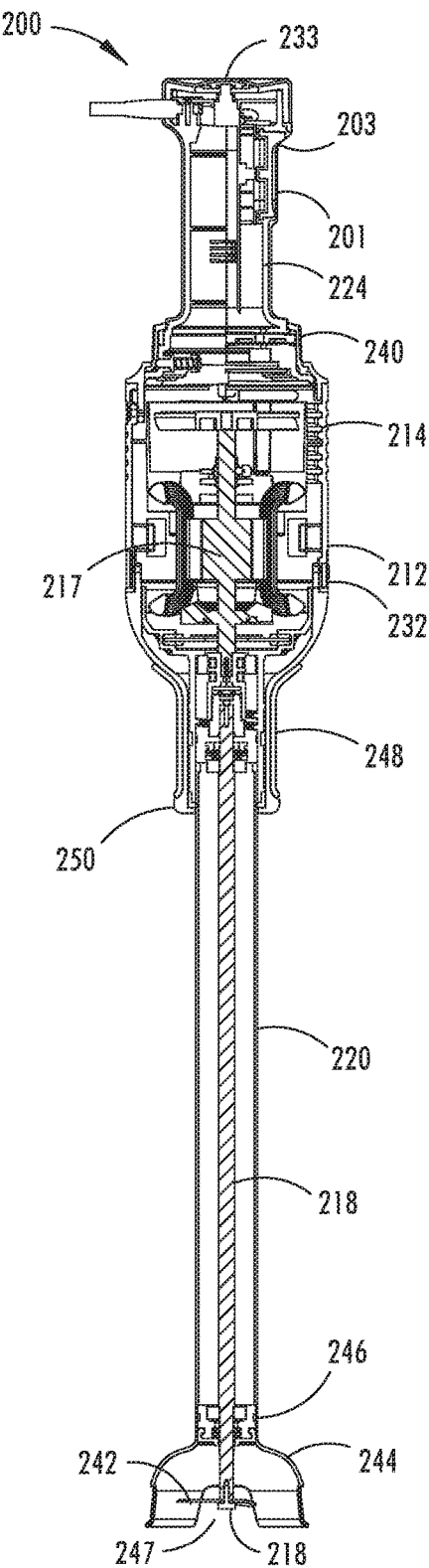
FIG. 30 is a side cross-sectional elevational view of the immersion blender of FIG. 21 taken at line B-B.

As illustrated in FIGS. 25, 31A, and 31B and disclosed in more detail herein, the immersion blender 200 can be manually activated and pulsed via the pulse button 201 disposed on the top handle 224. However, the immersion blender 200 also includes an interlock switch 253 for use with a continuous run feature that can operate in a hands free environment. The interlock switch 253 is disposed in the housing 212. It is generally contemplated that the continuous run feature will be available through the use of a securing device, such as a bowl clamp 260, that can maintain the immersion blender 200 in a particular position relative to a bowl 261. The continuous run feature allows a user to activate the immersion blender 200, while the immersion blender 200 is secured to the bowl 261, and leave the immersion blender 200 operating for a predetermined period. This same functionality is generally prohibited when the immersion blender 200 is being used manually by a user. Stated differently, the continuous run feature can be used when the immersion blender 200 is coupled with a bowl 261 via a bowl clamp or similar device.

The continuous run feature includes an electrical or mechanical interlock switch 253 that is disposed inside a receiving port 263 positioned on a side portion of the housing 212 of the immersion blender 200 and is activated only when the bowl clamp 260 is secured therewith. It is generally contemplated that the interlock switch 253 may be depressed when the immersion blender 200 is secured with the bowl clamp 260. Alternatively, the interlock switch 253 may be depressed after the immersion blender 200 has been secured with the bowl clamp 260 in the bowl 261. In this instance, a user takes the additional step to cause a port connecting member having a switching engagement member to engage the interlock switch 253 as disclosed in further detail herein. When the interlock switch 253 is depressed, a continuous run switch 268 disposed on an outside of the housing 212 can be depressed after the pulse button 201 disposed on the top handle 224 is actuated, thereby leaving the immersion blender 200 in an activated state. If the interlock switch 253 is not depressed, the continuous run switch 268 cannot be permanently depressed or activated. Consequently, the pulse button 201 cannot be maintained in an actuated state unless a user physically holds the pulse button 201 down.

With reference again to FIGS. 31A and 31B, the receiving port 263 is also configured to receive the secondary handle 227. However, the secondary handle 227 does not engage the interlock switch 253. Rather, the secondary handle 227 includes a void 274 into which the interlock switch 253 extends. Consequently, the interlock switch 253 is not pushed or depressed when the secondary handle 227 is engaged with the housing 212. Thus, the continuous run switch 268 will not actuate and the immersion blender 200 cannot be left operating without a user applying force to the pulse button 201 or continuous on the upper button 203. The shaft cover 220 of the immersion blender 200 also includes a screw on blender interface 280 (FIG. 46), which may include a detent 282.

Figure 35:
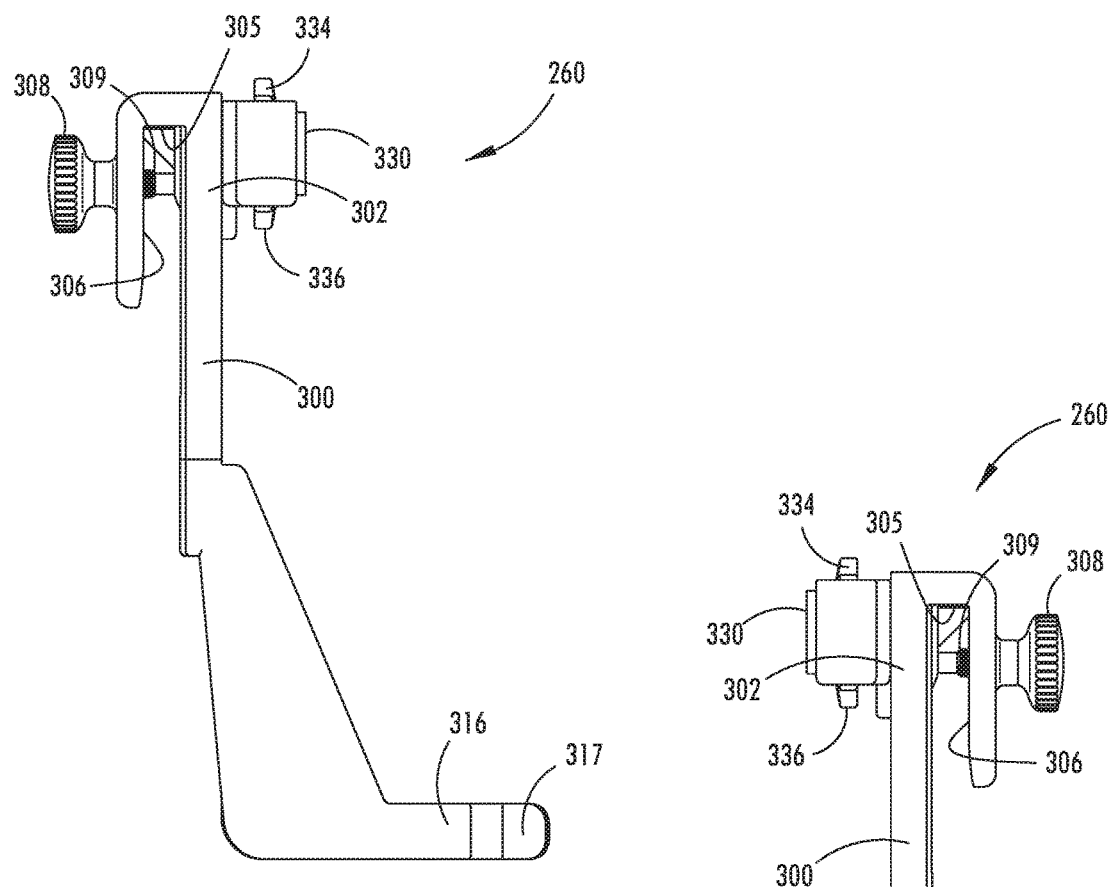
FIG. 35 is a first side elevational view of the bowl clamp of FIG. 33.
Figure 36:
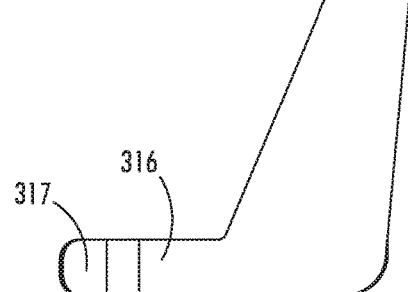
FIG. 36 is a second side elevational view of the bowl clamp of FIG. 33.
Figure 37:
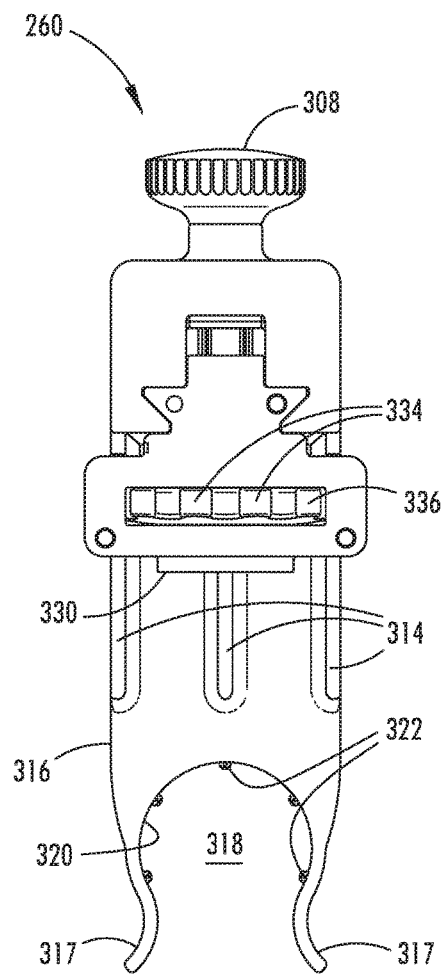
FIG. 37 is a top plan view of the bowl clamp of FIG. 33.
Figure 38:
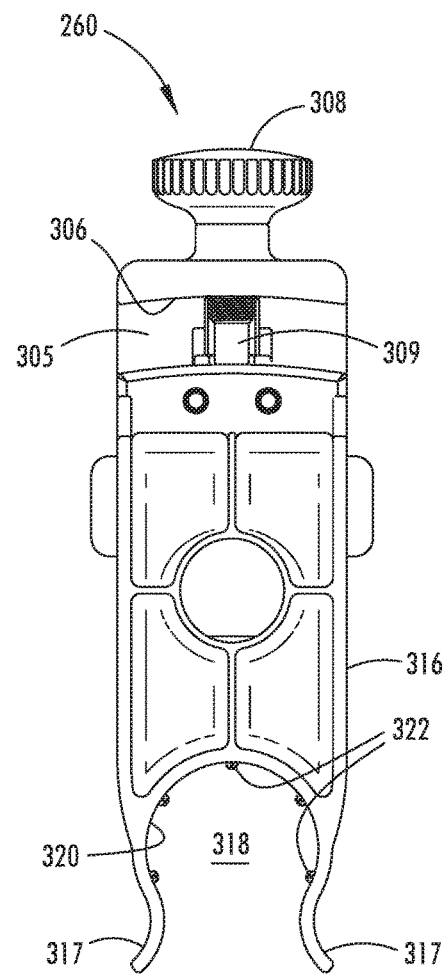
FIG. 38 is a bottom plan view of the bowl clamp of FIG. 33.
Figure 39:
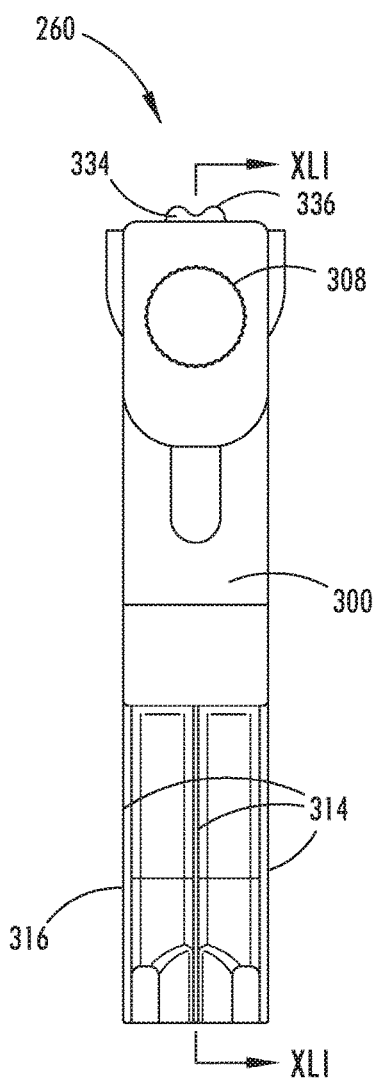
FIG. 39 is a front elevational view of the bowl clamp of FIG. 33.
Figure 40:
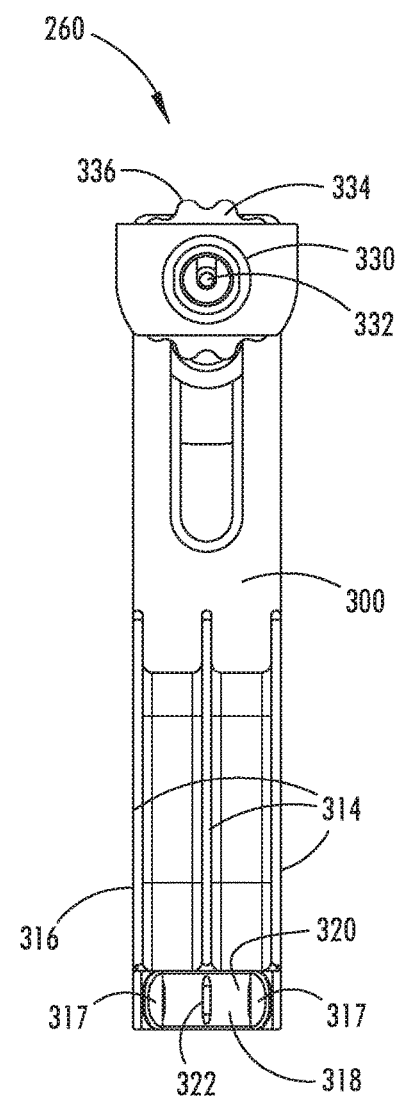
FIG. 40 is a rear elevational view of the bowl clamp of FIG. 33.
Figure 41:
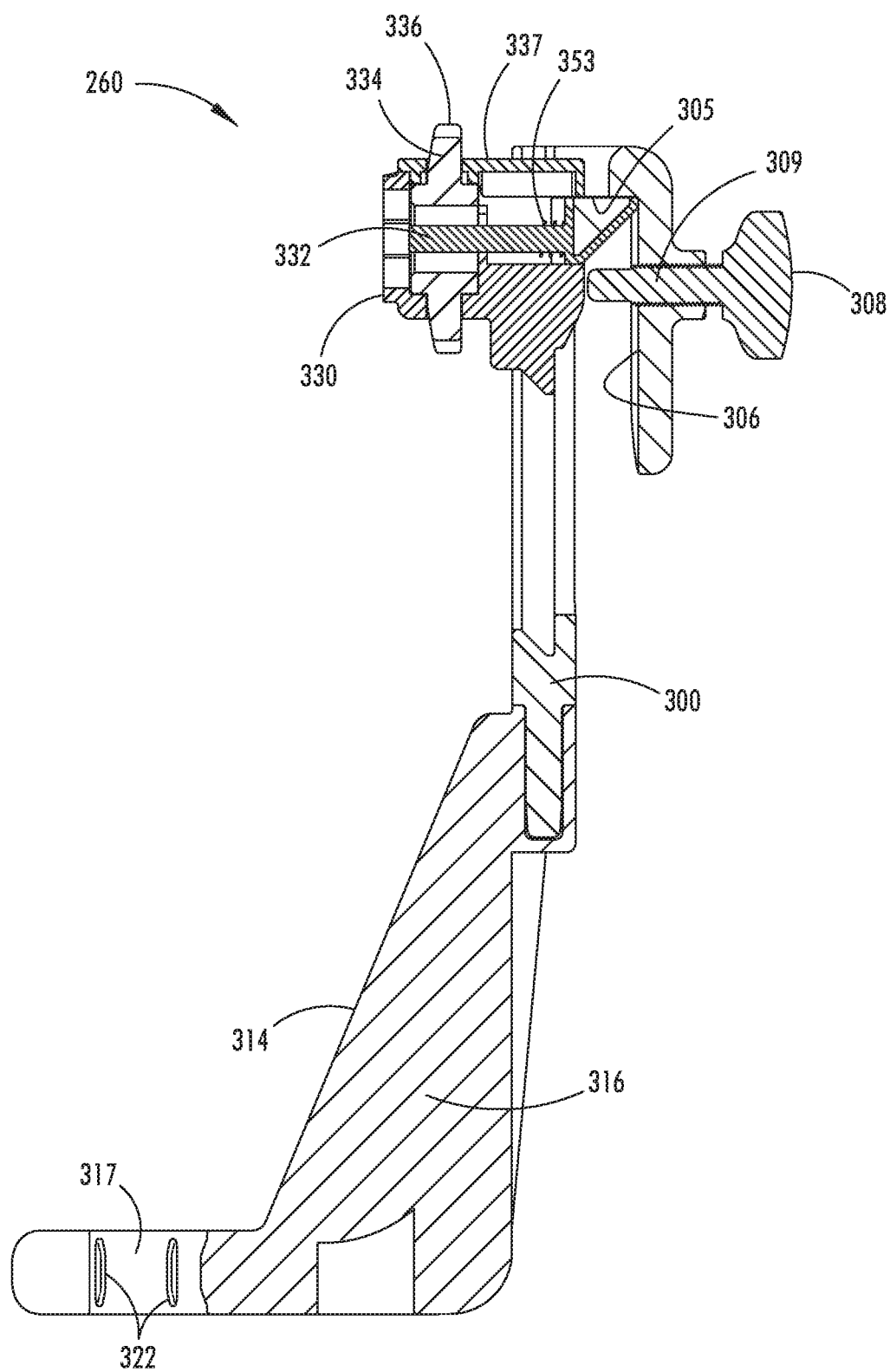
FIG. 41 is a side cross-sectional view of the bowl clamp of FIG. 33.
Figure 42:
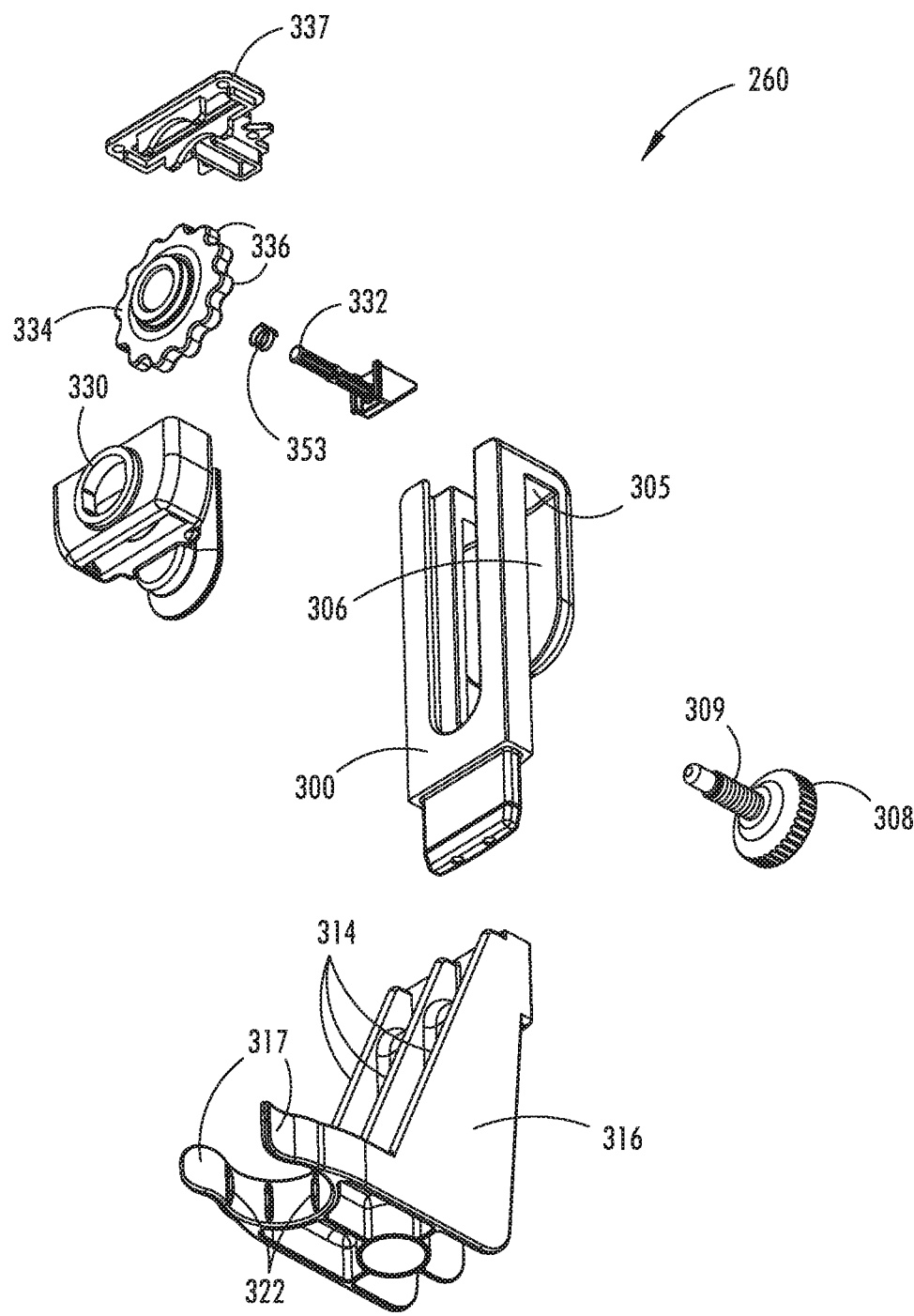
FIG. 42 is an exploded bottom perspective view of the bowl clamp of FIG. 33.
Figure 43:
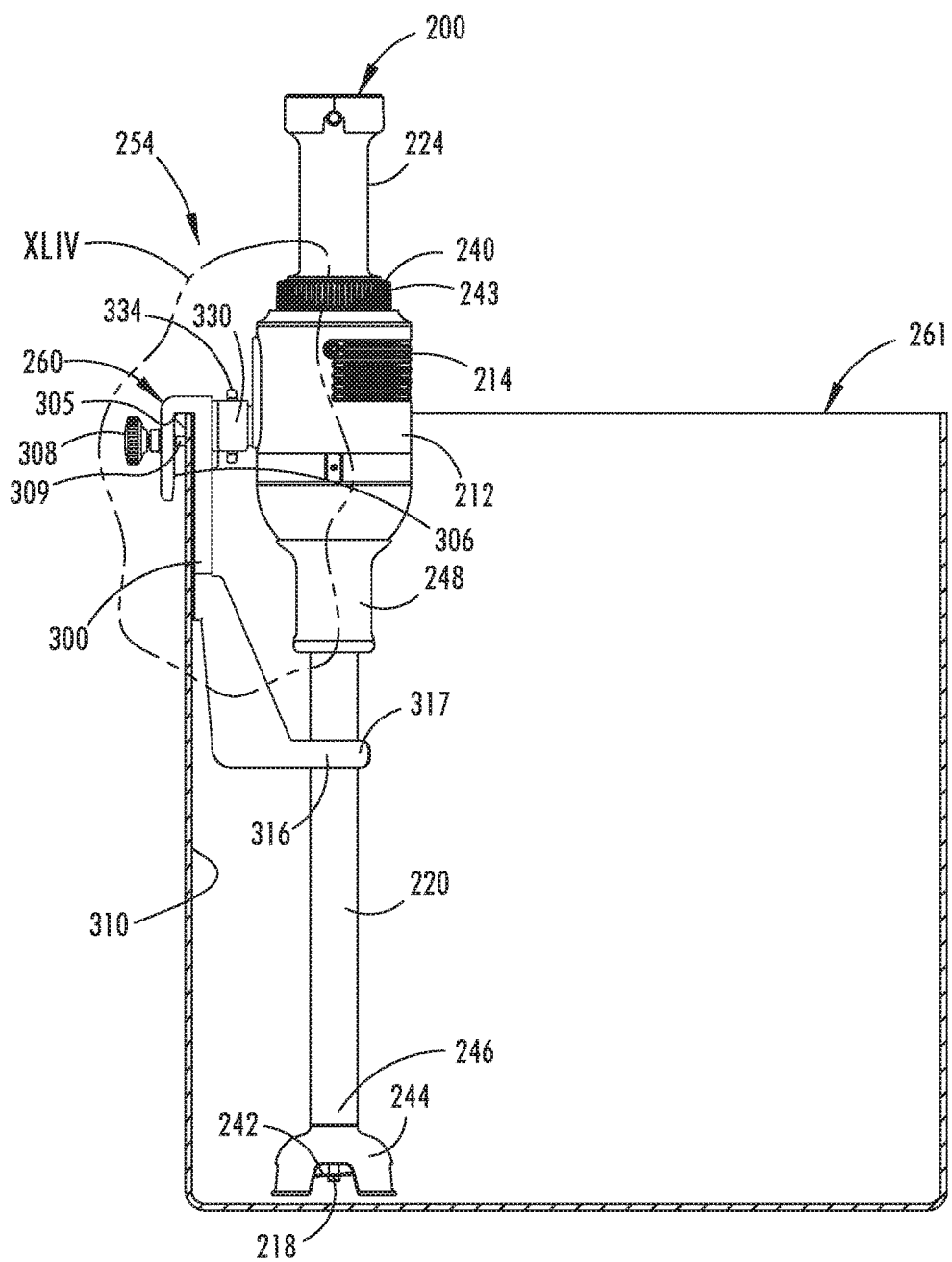
FIG. 43 is a side cross-sectional view of a bowl with a bowl clamp and immersion blender of the present disclosure disposed therein.
Figure 44:
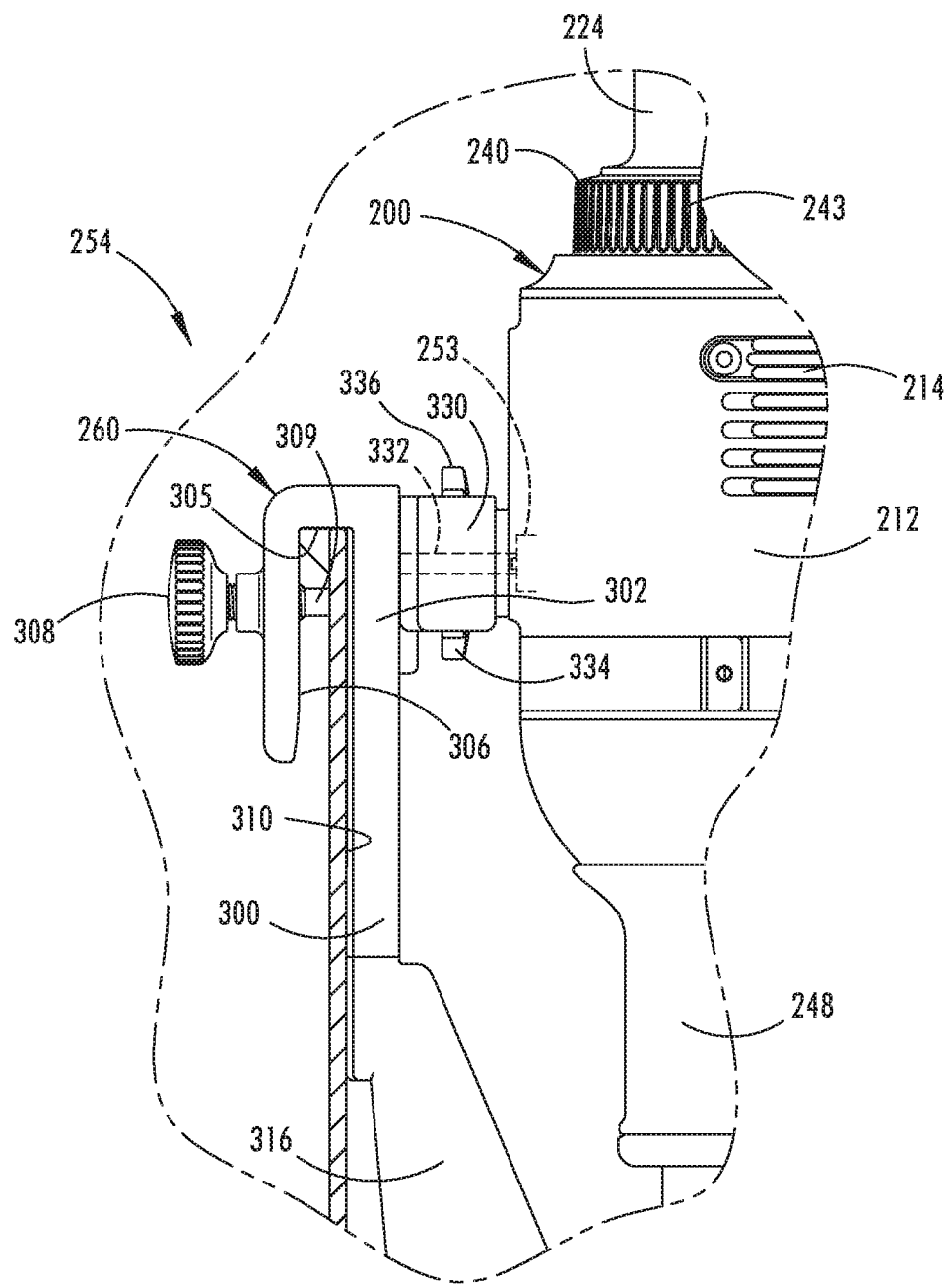
FIG. 44 is a side elevational view of the bowl clamp and immersion blender taken at area XLIV.

Referring now to FIGS. 33-45, one embodiment of the bowl clamp 260 is provided. The bowl clamp 260 includes a generally elongate body 300 configured to extend partially into the bowl 261 (FIG. 43). A top end 302 of the body 300 includes a clamping device 304 having a rim abutment member 305 and an outside abutment member 306. The outside abutment member 306 includes a tightener 308 with a threaded member 309 that rotates into a space defined between the outside abutment member 306 and the body 300 (FIGS. 35 and 36). As the tightener 308 is rotated, the body 300 is frictionally secured against an inside wall 310 of the bowl 261. A lower portion 312 of the body 300 includes a plurality of ribs 314 that stabilize an inwardly-projecting support arm 316. The inwardly-projecting support arm 316 includes securing tabs 317 that define a receiving slot 318 configured to engage the shaft cover support 248 of the immersion blender 200. It is also contemplated that the bowl clamp 260 may be connected to the bowl 261 only at a top portion thereof (see FIGS. 43 and 44). An inside wall 320 connecting the securing tabs 317 and defining the receiving slot 318 includes a plurality of friction members 322 that may include a material having a high coefficient of friction that will easily grasp the shaft cover support 248, securing the same within the receiving slot 318.

In use, the bowl clamp 260 is secured to the side of the bowl 261 with the body 300 extending into the bowl 261 and the receiving slot 318 projecting toward a center portion of the bowl 261. The immersion blender 200 is then positioned in the bowl 261 with the shaft cover support 248 securely engaged with the receiving slot 318 of the inwardly-projecting support arm 316. Once the inwardly-projecting support arm 316 is secured, a user is free to operate the immersion blender 200 as desired. Although shown opening forward, the receiving slot 318 could also open to either side of the body 300.

In the event the user wishes to operate the immersion blender 200 in a hands free condition without having to hold down the pulse button 201, the user can secure a port connecting member 330 disposed on the bowl clamp 260 with the receiving port 263 disposed in the side of the housing 212. The body 300 includes an elongate slot configured to allow vertical sliding movement of a port connecting member 330. Accordingly, the port connecting member 330, and consequently the immersion blender 200, can be moved vertically to accommodate different bowl sizes. In addition, the angle of the body 300 relative to the bowl 261 can be adjusted, as well as the angle of the immersion blender 200, relative to the port connecting member 330. The port connecting member 330 is configured to engage the interlock switch 253 disposed inside the receiving port 263, thereby enabling the continuous run feature. Specifically, the port connecting member 330 includes a switch engagement member 332 generally in the form of an adjustable pin, which may be biased by a spring 353, that engages the interlock switch 253 such that the continuous run switch 268 on the body 212 of the immersion blender 200 can be depressed and maintained in a depressed condition. The switch engagement member 332 can be adjusted laterally by a rotation of an adjustment wheel 334 that includes a plurality of undulations 336 thereon. Alternatively, the adjustment wheel 334 may act to draw the immersion blender 200 closer to the bowl clamp 260, resulting in the switch engagement member 332 being forced into contact with the interlock switch 253. The undulations 336 are provided to ease rotation of the wheel 334 by a user. The adjustment wheel 334 is retained by a coverplate 337. The adjustment wheel 334 can be rotated by a user to move the switch engagement member 332 into and out of engagement with the interlock switch 253. In the event the user wishes to lock the immersion blender 200 in a running state, then the user would rotate the adjustment wheel 334 such that the switch engagement member 332 engages the interlock switch 253. At the same time, the continuous run switch 268 would be depressed while the pulse button 201 is also depressed. The continuous run switch 268 can then be released by the user and the pulse button 201 can then be released by the user. Both the interlock switch 253 and the pulse button 201 will remain actuated, which results in the motor 217 continuing to run and the blade 242 at the end of the shaft 218 continuing to rotate. In the event the user wishes to deactivate the immersion blender 200 in the hand free state, the user simply depresses the pulse button 201, the continuous run switch 268, the on/off switch 233, or unplugs the immersion blender 200 from the power source, or disengages the immersion blender 200 with the bowl clamp 260.

As previously noted, the secondary handle 227 that is provided with the immersion blender 200 does not include the switch engagement member 332 configured to engage the interlock switch 253 inside the receiving port 263. Consequently, when the secondary handle 227 is coupled with the immersion blender 200, the immersion blender 200 cannot be left in an operating state unless the user is manually applying force to the pulse button 201.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A mixing appliance assembly comprising:
   a housing including a motor and a shaft operably coupled with the motor and extending outwardly from the housing;
   a top handle operably coupled with a top end of the housing and including a pulse button and a continuous run switch;
   a side port disposed in the housing, the side port configured to receive a port connecting member and having an interlocking feature comprising:
      an interlock switch disposed inside the side port; and
      a switch engagement member configured to engage the interlock switch such that the continuous run switch can be depressed;
   a bowl clamp engageable with the side port and configured to removably secure the housing to a bowl, the bowl clamp including the switch engagement member; and
   a side handle engageable with the side port and configured to be removably coupled with the housing and aid a user in handling said mixing appliance assembly, the side handle being free of the switch engagement member.

2. The mixing appliance assembly of claim 1, wherein the side handle includes an elongate configuration.

3. The mixing appliance assembly of claim 2, wherein the side handle includes a flange defining a flared connecting end of the side handle.

4. The mixing appliance assembly of claim 1, further comprising:
   a band that extends around the housing.

5. The mixing appliance assembly of claim 1, further comprising:
   a plurality of lateral vents extending around the housing.

6. The mixing appliance assembly of claim 1, wherein the housing includes an upper portion proximate the top handle and a lower portion proximate the upper portion, and further wherein the upper portion includes a smaller width than the lower portion.

7. The mixing appliance assembly of claim 1, further comprising:
   a downwardly turned cup portion disposed on a distal end of a shaft cover.

8. The mixing appliance assembly of claim 1, wherein the top handle extends laterally between first and second supports.

9. The mixing appliance assembly of claim 7, wherein the top handle extends from the housing in a direction away from, but concentrically aligned with, the shaft cover.

10. The mixing appliance assembly of claim 1, wherein the bowl clamp includes a tightener with a threaded member configured to rotate into a space defined between an outside abutment member and a body of the bowl clamp.

\* \* \* \* \*